United States Patent
Crain et al.

(10) Patent No.: US 6,688,566 B1
(45) Date of Patent: Feb. 10, 2004

(54) SURVEYING EQUIPMENT SUPPORT HAVING TELESCOPING LEGS

(75) Inventors: Stephen B. Crain, Cape Girardeau, MO (US); Ronnie D. Everly, Mounds, IL (US); Larry W. Essex, Villa Ridge, IL (US); Ralph C. Mize, Mounds, IL (US); Jerry L. Williamson, Olmsted, IL (US)

(73) Assignee: Crain Enterprises, Inc., Mound City, IL (US)

( * ) Notice: Subject to any disclaimer, the term of this patent is extended or adjusted under 35 U.S.C. 154(b) by 0 days.

(21) Appl. No.: 09/685,278

(22) Filed: Oct. 10, 2000

(51) Int. Cl.⁷ .............................................. F16M 11/38
(52) U.S. Cl. .................................................... 248/168
(58) Field of Search ................................. 248/161, 410, 248/412, 170, 177.1, 156, 168, 222.11, 229.24, 228.5, 230.5, 231.61

(56) References Cited

U.S. PATENT DOCUMENTS

| | | | |
|---|---|---|---|
| 205,481 A | * | 7/1878 | Gurley ........................ 248/168 |
| 663,535 A | | 12/1900 | Essner et al. |
| 667,624 A | | 2/1901 | Hogan et al. |
| 821,335 A | | 5/1906 | Butler |
| 1,495,458 A | | 5/1924 | Thalhammer |
| 1,808,848 A | * | 6/1931 | Haynes ........................ 248/168 |
| 2,445,543 A | | 7/1948 | Thines |
| 2,653,000 A | | 9/1953 | Cadwell et al. |
| 3,894,805 A | | 7/1975 | Middleton |
| 3,941,492 A | | 3/1976 | Meinunger |
| 3,963,207 A | | 6/1976 | Guasti |
| 4,339,880 A | | 7/1982 | Hall |
| 4,455,005 A | | 6/1984 | Mooney |
| 4,767,090 A | | 8/1988 | Hartman et al. |
| 4,840,338 A | | 6/1989 | O'Connor |
| 4,872,627 A | | 10/1989 | O'Connor |
| 4,932,622 A | | 6/1990 | Hayakawa |
| 5,253,833 A | | 10/1993 | Indou |
| 5,320,316 A | * | 6/1994 | Baker ........................ 248/163.1 |
| 5,452,877 A | | 9/1995 | Riffle et al. |
| 5,503,357 A | | 4/1996 | Johnson et al. |
| 5,791,435 A | | 8/1998 | Garnett |
| 5,887,835 A | | 3/1999 | Hein et al. |
| 6,290,197 B1 | | 9/2001 | Newton |

FOREIGN PATENT DOCUMENTS

| | | |
|---|---|---|
| DE | 26 40 610 | 3/1978 |
| DE | 38 05 260 A1 | 8/1989 |

* cited by examiner

Primary Examiner—Ramon O. Ramirez
Assistant Examiner—Kofi Schulterbrandt
(74) Attorney, Agent, or Firm—Senniger, Powers, Leavitt & Roedel

(57) ABSTRACT

A support for surveying equipment and the like has telescoping legs and a locking system including a clamp for locking the legs in a selected position of extension. The two telescoping leg members making up each leg have wedge formations which engage over a wide surface when clamped together to facilitate locking. The clamp is formed to actively release from locking the leg members which the clamp is unlocked. The leg members are particularly constructed to permit surveying tools or other objects to be permanently or replaceably mounted on the legs. A hinge connection of the legs permits them to pivot together in a collapsed position is formed in a unitary fashion with one of the leg members for additional strength. The hinge also holds the leg member to facilitate interlocking the leg members at a selected position of extension.

79 Claims, 30 Drawing Sheets

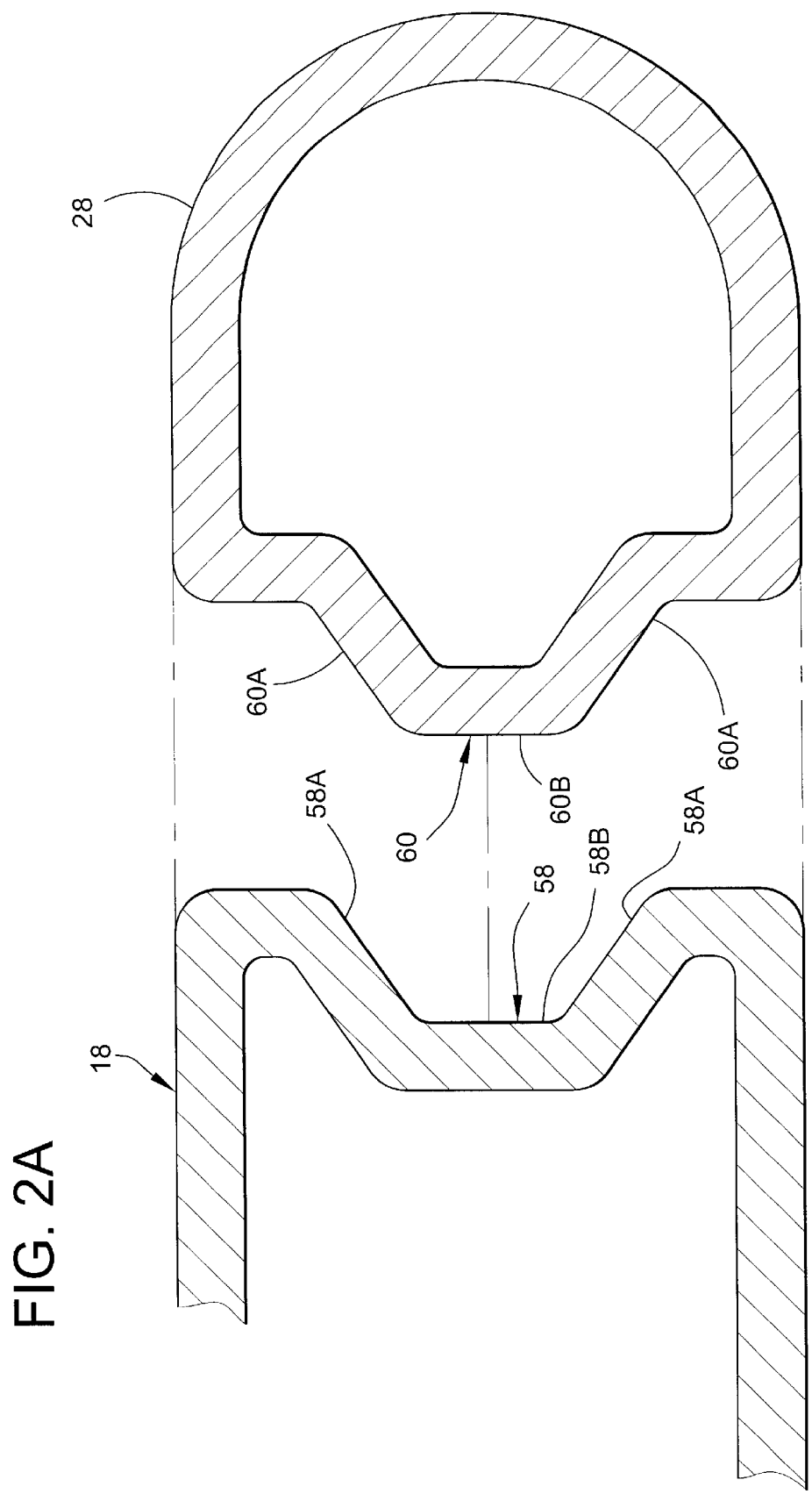

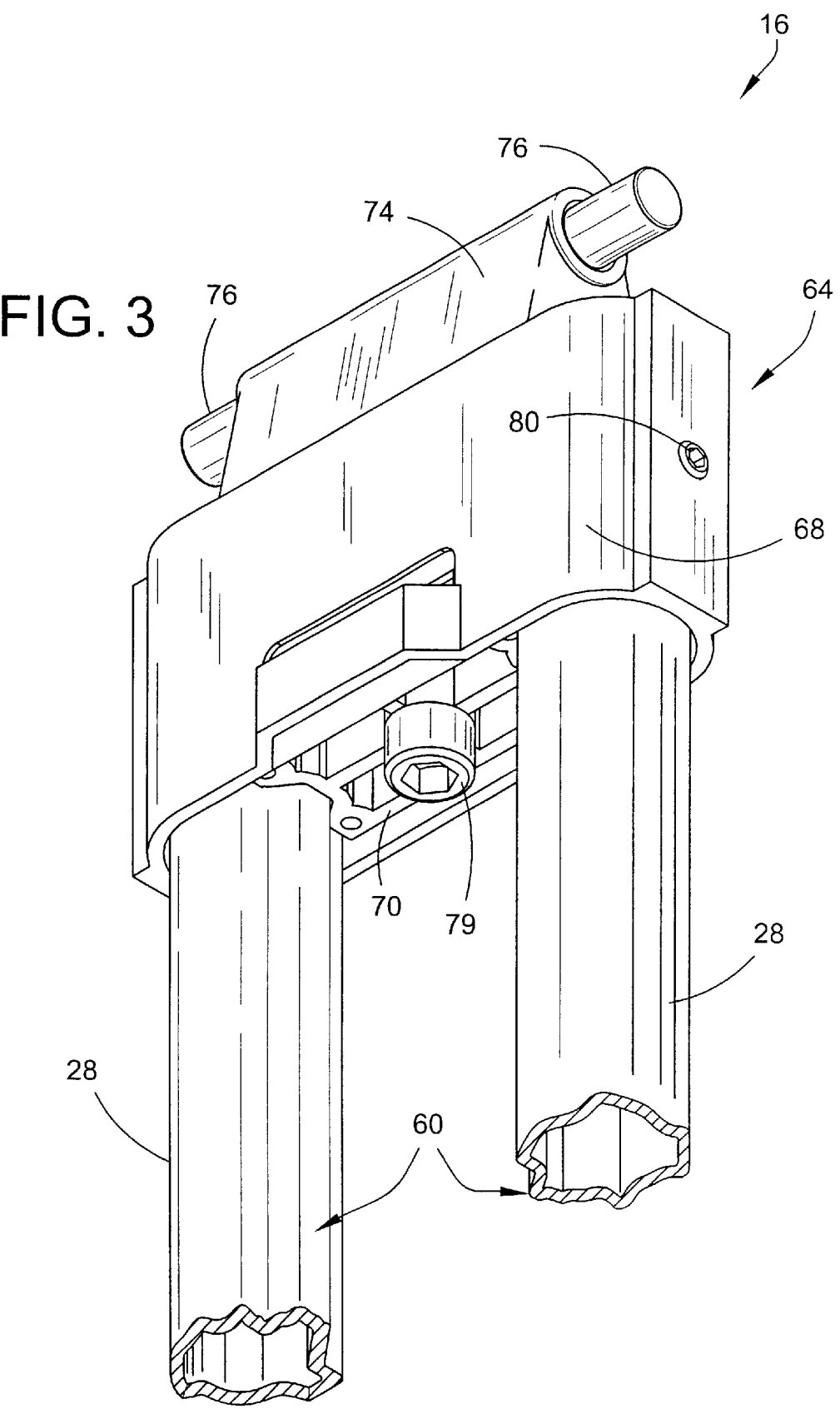

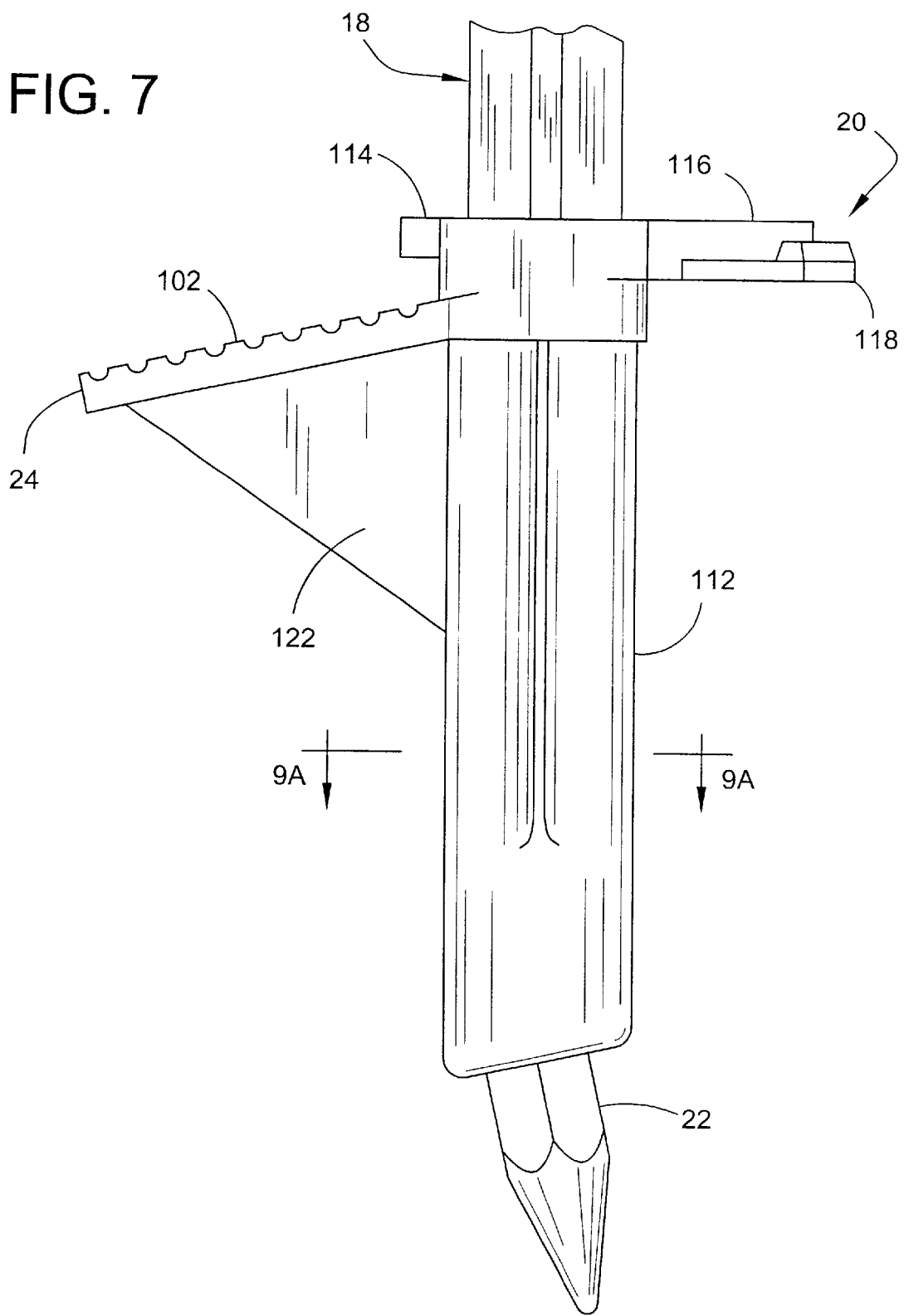

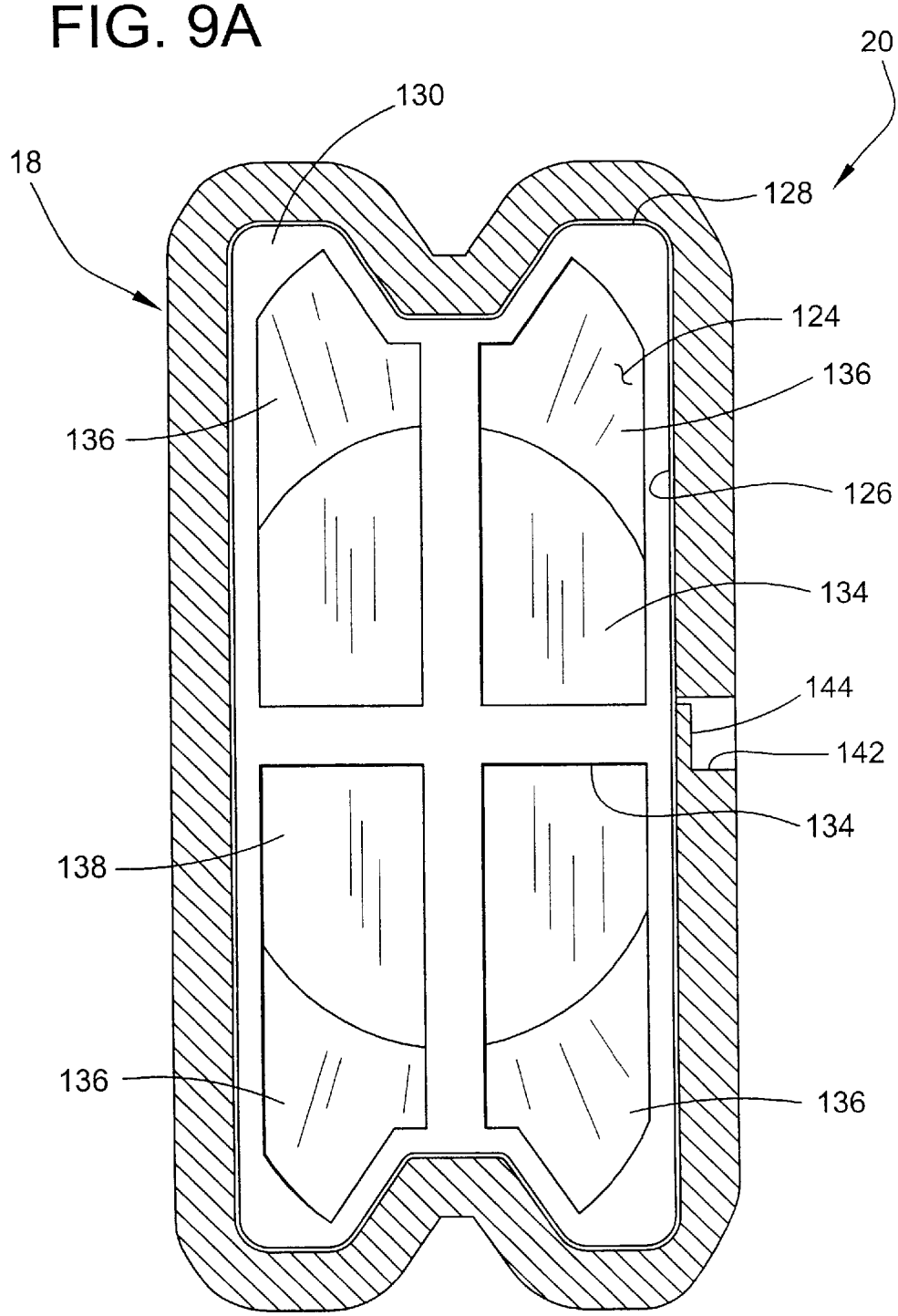

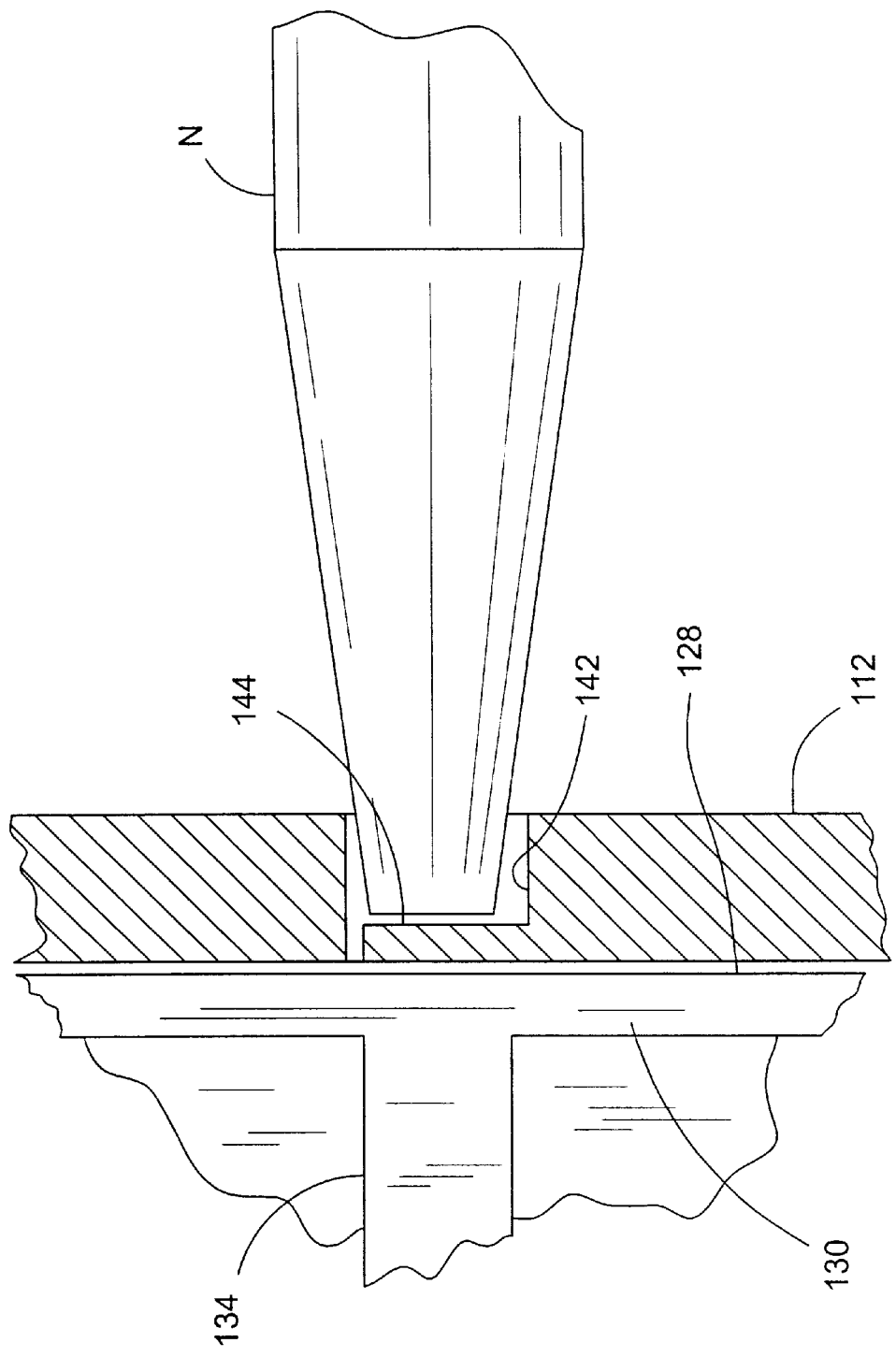

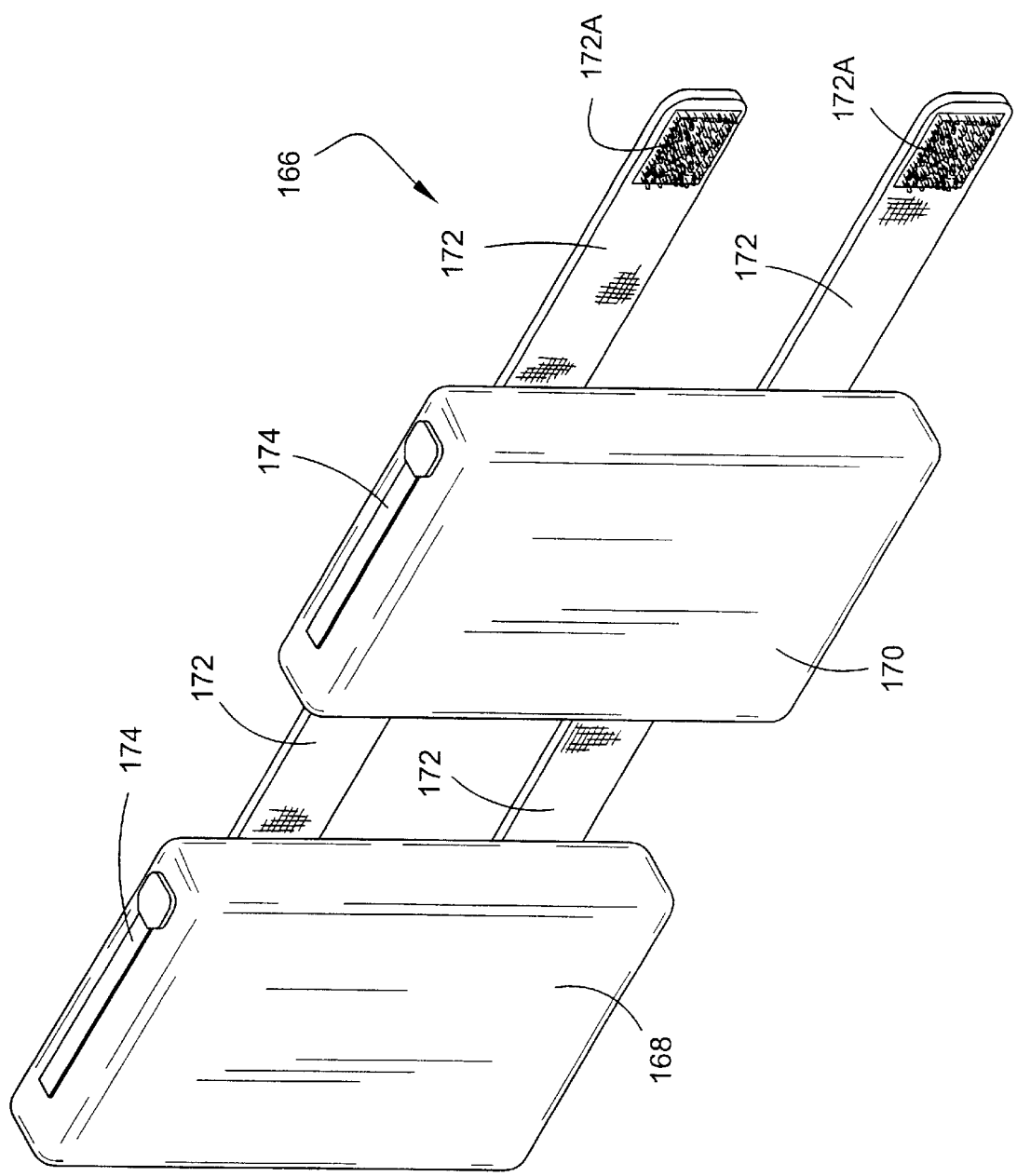

SURVEYING EQUIPMENT SUPPORT HAVING TELESCOPING LEGS

BACKGROUND OF THE INVENTION

This invention relates generally to portable supports and more particularly to such supports suitable for holding surveying equipment and the like.

Although the art of surveying is old, recent improvements in equipment, such as automatic electronic total surveying stations, have increased the accuracy of the surveying instruments far beyond what was possible previously. Where accepted accuracy for equipment in the not too distance past was 20 seconds of a degree, accuracy is now commonly required to be 1 second of a degree. At these levels of precision, the instruments must be supported in a manner which is consistent and stable. Accordingly, there is a need for closer examination of support structure used for surveying equipment so that improvements in instrumentation will not be lessened by inadequate supports.

A most common support for surveying equipment is the tripod with telescoping legs that can be retracted for carrying and storage. Certainly bipods are also employed in surveying, and conceivably any number of legs could be provided, but the three point support remains the most common. Frequently, surveying is done far from roads or sidewalks so equipment may have to be carried over broken terrain for considerable distances to reach the site. As a result, it is imperative that the tripod be able to collapse for easy transportation. However, the ability to collapse can be the source of imprecision in supporting the equipment when the site is reached. When the telescoping legs are extended, it is necessary that they be locked in place. Movement thereafter, even on a scale which would not be readily perceptible to the surveyors, can detrimentally affect the accuracy of the supported equipment. Presently, locking devices used for locking the legs in a fixed position of extension are clamps which apply a clamping force to raise the static friction between the leg members over a highly localized area. To hold the leg members securely a substantial force is required. Tripods having metal legs are usually able to withstand the force, but are capable of plastic deformation over time so that there is a loss of clamping force. Lighter weight, non-metallic materials do not work well at all with highly localized application of the clamping force, making it more difficult to use these materials. Often a second clamp is used to provide the clamping force in two locations.

A typical construction of a telescoping leg may have a center extensible leg member and two fixed leg members, in the form of rods, on opposite sides of the center leg member. Rounded channels are provided in the sides of the center leg member which receive the round rods, connecting the leg members together for relative sliding motion. The rods are squeezed into respective channels to lock the leg members in a selected position of extension. However, in practice the contact between each rod and the center leg member in the channel is frequently only along a line. In practice, line contact substantially limits the static friction between the rods and the center leg member even when a large clamping force is applied, making it more likely that some small movement may occur even after the leg members are locked in position.

Problems with accuracy and stability in positioning instrumentation may also arise from minor damage to the tripod which may occur when the tripod is being stored or transported. The rods are held at their upper ends in a hinge which attaches the rods to a head of the tripod on which equipment is mounted. The hinge permits the legs to be pivoted between a use position in which the legs are separated apart and a collapsed position in which the legs are close together, usually contacting each other. The rods are bolted or otherwise fixed to the hinge at spaced apart locations so that the hinge tends to act like a parallelogram linkage when lateral forces are applied to the hinge. There is a tendency for the rods to tilt into a parallelogram configuration, perhaps becoming permanently deformed in this configuration. A similar thing may happen when motorized equipment mounted on the head turns, applying torsional load to the leg.

SUMMARY OF THE INVENTION

Among the several objects and features of the present invention may be noted the provision of a support for surveying equipment which provides a stable and rigid platform for high precision surveying equipment; the provision of such a support which tightly locks telescoping leg members of the support in a selected position of extension; the provision of such a support which requires minimal clamping force to achieve the leg member lock; the provision of such a support which helps to keep the clamp from sticking in a locked position; the provision of such a support which actively operates to unlock the leg members when the clamping force is released; the provision of such a support which can be made of lighter weight material; the provision of such a support which is made of material which is not subject to plastic deformation; the provision of such a support which has legs constructed to resist lateral loads; the provision of such a support which is easy to transport; the provision of such a support which can be manufactured with high precision; and the provision of such a support which can be manufactured economically.

Further among the several objects and features of the present invention may be noted the provision of a method of assembling a leg for a portable support which produces a strong, lightweight leg; the provision of such a method which repeatedly produces high precision in the assembled leg; the provision of such a method which can be rapidly carried out in assembly line production; the provision of such a method which produces a unitary structural unit; and the provision of such a method which can be carried out economically.

Generally, a portable support for use in supporting equipment above a surface comprises a head for holding the equipment and legs connected to the head for supporting the head above the surface. Each leg comprises a fixed leg member connected to the head and a telescoping leg member connected to the fixed leg member for sliding motion relative to the leg member between a fully extended position and a fully retracted position. A clamp has a locked position for squeezing the telescoping leg member and the fixed leg member together to secure the telescoping leg member in a selected position relative to the fixed leg member, and an unlocked position in which the telescoping leg member is movable relative to the fixed leg member. The fixed leg member and the telescoping leg member of at least one of the legs each including a generally wedge-shaped engagement formation interengageable with the wedge-shaped engagement formation of the other under the clamping force of the clamp in the locked position to hold the telescoping leg member in a fixed position with respect to the fixed leg member. The wedge-shaped formations being sized and shaped to prevent the formations from bottoming out in the locked position of the clamp.

In another aspect of the present invention a leg for a support as described above.

In a further aspect of the present invention, a leg for a portable support for use in supporting equipment above a surface generally comprises a fixed leg member and a telescoping leg member connected to the fixed leg member for sliding motion relative to the leg member between a fully extended position and a fully retracted position. The fixed leg member comprises a pair of rods disposed on opposite sides of the telescoping leg member and a rod receptacle comprising a housing, a locating block, a fastener for securing the rods against the locating block in a relaxed position in which the rods are substantially stress-free, and adhesive in the housing substantially filling spaces in the housing. A clamp has a locked position for deflecting the rods inwardly from the relaxed position toward the telescoping member to selectively secure the telescoping leg member in a selected position relative to the fixed leg member, and an unlocked position in which rods are released to their relaxed positions and the telescoping leg member is movable relative to the rods.

In a still further aspect of the present invention, a method for making a leg for a portable support generally comprises the steps of placing the ends of two rods in a housing and locating the rods against a locator block on opposite sides thereof such that the locator block fixes the separation of the rods. Adhesive is injected into the housing around the rods and block to substantially fill the housing whereby the rods, locating block and housing constitute a substantially unitary structure. A telescoping leg member is fitted between the rods such that the telescoping leg member is capable of sliding longitudinally of the rods for selective adjustment of the length of the leg.

In yet another aspect of the present invention, a leg for a portable support for use in supporting equipment above a surface generally comprises a fixed leg member and a telescoping leg member connected to the fixed leg member for sliding motion relative to the leg member between a fully extended position and a fully retracted position. The telescoping leg member has a front face directed generally outwardly of the support and a rear face. The telescoping leg member is connected to the fixed leg member so that the telescoping leg member is free of obstructions at least at one point on the front face at all locations of the telescoping leg member between the filly extended and fully retracted positions.

In a further aspect of the present invention, a portable support for use in supporting equipment above a surface generally comprises a head for holding the equipment and legs connected to the head for supporting the head above the surface. Each leg comprises a fixed leg member connected to the head and a telescoping leg member connected to the fixed leg member for sliding motion relative to the leg member between a fully extended position and a fully retracted position. A clamp has a locked position for squeezing the telescoping leg member and the fixed leg member together to secure the telescoping leg member in a selected position relative to the fixed leg member, and an unlocked position in which the telescoping leg member is movable relative to the fixed leg member. The clamp comprises a pair of opposed jaws located on opposite sides of the leg and a connecting bar slidably connecting the jaws together. A cam pivotally mounted on the connecting bar and engageable with one of the jaws is operable to push the jaws toward each other on the connecting bar in the locked position and to permit the jaws to move apart in the unlocked position. At least one spring release element associated with one of the jaws between the jaw and the leg is compressed against the leg when the clamp is in the locked position. The spring element actively pushes the jaws apart when the cam permits the jaws to move apart.

Other objects and features of the present invention will be in part apparent and in part pointed out hereinafter.

BRIEF DESCRIPTION OF THE DRAWINGS

FIG. 2A is an enlarged fragmentary view of one side of FIG. 2 with parts exploded to facilitate description;

FIG. 3 is a fragmentary perspective of an upper end of a leg of the tripod;

FIG. 7 is a side elevation of a foot;

FIG. 9A is a section taken in the plane including line 9A—9A of FIG. 7;

FIG. 9B is a greatly enlarged fragment of the section of FIG. 9 showing an adhesive port and schematically illustrating an injection nozzle;

FIG. 13A is a perspective of the leg weight laid out flat, from the front of the leg weight;

Corresponding reference characters indicate corresponding parts throughout the several views of the drawings.

DETAILED DESCRIPTION OF THE PREFERRED EMBODIMENTS

Figure 1:
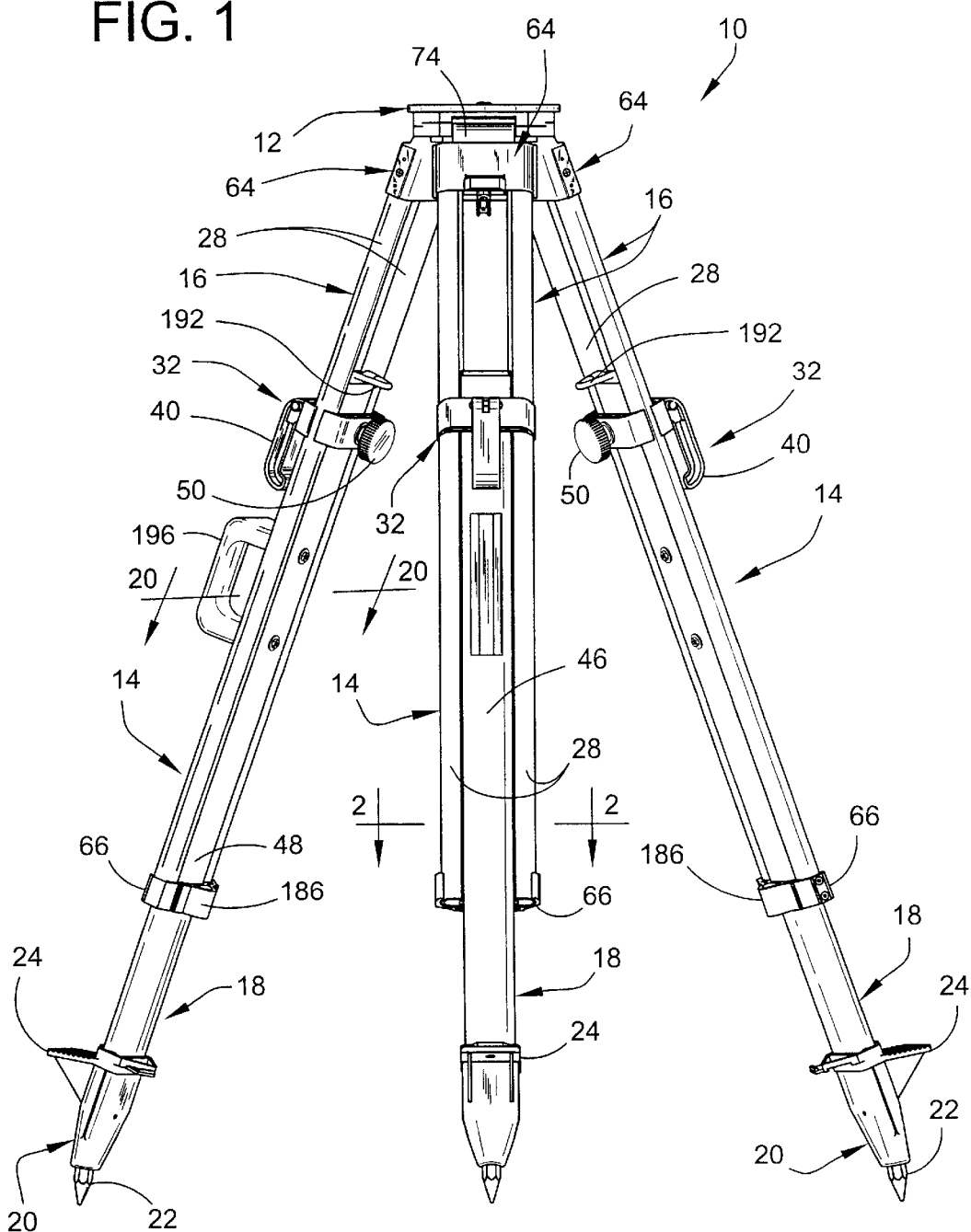
FIG. 1 is an elevation of a tripod of the present invention.

Referring now to the drawings, and in particular to FIG. 1, a portable support of the present invention in the form of a tripod is designated generally at 10. The tripod includes a head 12 for holding equipment (not shown) above a surface, typically the ground, and three legs 14 (the reference numbers indicating their subjects generally). The tripod 10 is particularly suited for holding surveying equipment in a stable and accurate manner, but could be used to support other items. Moreover, the support could have more or less than three legs without departing from the scope of the present invention. Still further, legs 14 constructed according to the present invention may be retrofit to existing tripods. The legs 14 are pivotally attached to the head 12 for movement between a use position (shown in FIG. 1) where the legs are spread apart, and a collapsed position where the legs are closer together. Each leg 14 includes a fixed leg member indicated generally at 16, which is connected to the head 12. The leg 14 also includes a telescoping leg member indicated generally at 18, which is connected to the fixed leg member for sliding motion relative to the fixed leg member between a fully extended position and a fully retracted position. As shown in FIG. 1, the telescoping leg members 18 have been partially extended from the fixed leg members 16 as selected for placing the surveying equipment at a particular height and horizontal orientation. The legs 14 further include feet, generally indicated at 20, which engage the ground. Points 22 on the bottom end of the feet 20 can penetrate the ground to help secure the tripod 10 in place. Pedals 24 formed integrally with each foot 20 can be used to apply a downward force on the foot for penetrating the ground to firmly plant the foot in the ground.

The fixed leg member 16 of each leg 14 comprises a pair of rods 28 located on opposite sides of the telescoping leg member 18. In the preferred embodiment, the rods 28 and the telescoping leg member 18 are extruded (more specifically, "pultruded") from fiberglass or a similar material. Fiberglass has desirable properties of being resistant to warping and plastic deformation, which are detrimental to the precision of the tripod 10. Extrusion may be carried out rapidly and economically. It is also envisioned that the internal diameter and internal shape of the rods 28 and telescoping leg member 18 can be readily adjusted in the extrusion process as necessary to increase strength in a particular location. That is, more and/or stronger material may be added in a particular location as needed.

Figure 22:
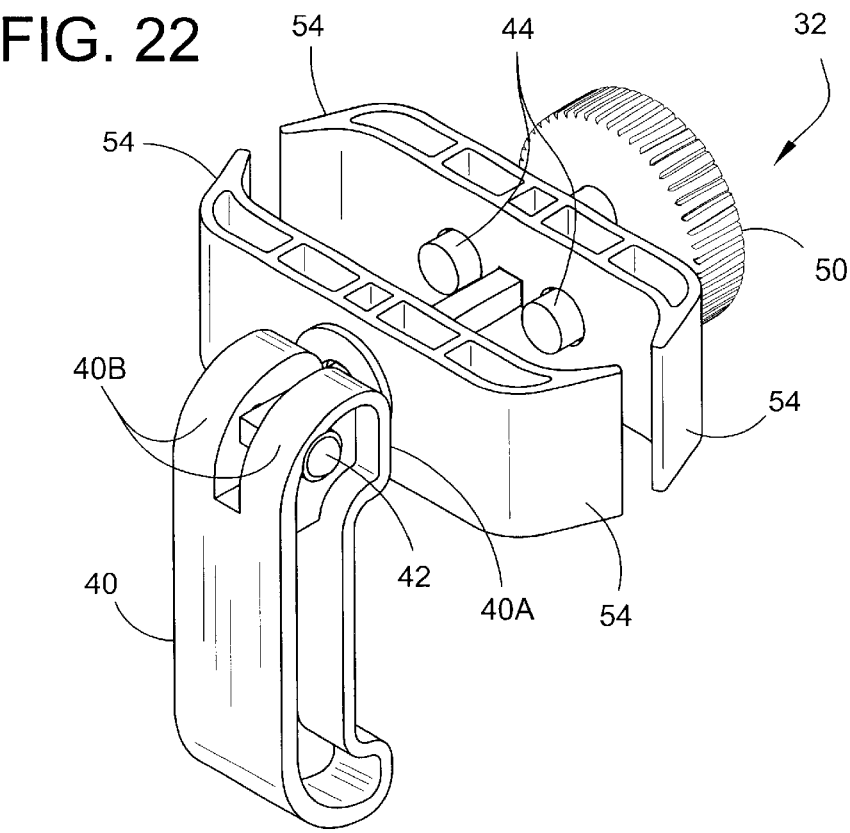
FIG. 22 is a perspective of a clamp of the tripod.

A clamp, generally indicated at 32, is mounted on the telescoping leg member 18 and fitted around the rods 28. The clamp 32 has a locked position in which the clamp squeezes the rods 28 against the telescoping leg member 18 to secure the telescoping leg member in a selected position of extension relative to the rods. In an unlocked position of the clamp 32, the telescoping leg member 18 is movable relative to the rods 28 between the fully retracted and fully extended positions. As shown in FIG. 1, the clamp 32 on each leg 14 is in the locked position, as is the clamp illustrated separately from the tripod leg in FIGS. 22 and 23. The clamp 32 includes a front jaw 34, a rear jaw 36 and a bar 38 interconnecting the front and rear jaws and maintaining the jaws in alignment. The bar 38 permits sliding motion of the jaws 34, 36 relative to each other lengthwise of the bar. At a front end portion of the bar 38, a cam lever 40 is pivotally mounted by a pin 42 for pivoting movement of the lever about an axis transverse to the bar. The bar 38 has a rectangular cross section and engages the jaws 34, 36 and the telescoping member 18 to hold the jaws from rotation about the axis of the bar. Thus, the bar 38 holds the jaws 34, 36 in precise alignment for the application of clamping force to the rods 28. The cam lever 40 has a pair of cam surfaces 40A and release surfaces 40B separated by a gap present to receive the bar 38. The cam surfaces 40A are located radially farther outward from the pin 42 than the release surfaces 40B. Thus, when the lever 40 is pivoted to bring the cam surfaces 40A into engagement with the front jaw 34, the jaw is pushed away from the pin 42 toward the rear jaw 36, placing the clamp 32 in the locked position. When the lever 40 is swung up so that it extends outwardly from the leg 14, the release surfaces 40B engage the front jaw 34. The front jaw and the rear jaw 36 can move farther apart in this unlocked position, allowing the rods 28 to move laterally outwardly from the telescoping leg member 18 to release the telescoping leg member from the fixed leg member 16. The cam surfaces 40A are curved and the flat release surfaces 40B are tangent to the curve of the cam surfaces where the surfaces intersect to provide a smooth transition between the cam and release surfaces. As a result, the front and rear jaws 34, 36 do not over-travel when the cam lever 40 is pivoted to close the jaws in the locked position.

To facilitate opening the front and rear jaws 34, 36 when the clamp 32 is unlocked, the clamp is provided with rubber cylinders 44. Two cylinders are mounted on each of the front and rear jaws 34, 36, and project inwardly into engagement with a front face 46 and a rear face 48 (respectively) of the telescoping leg member 18. When the clamp 32 is locked, the rubber cylinders 44 are resiliently compressed against the faces 46, 48. When the clamping force is relieved, the cylinders 44 act to push the front and rear jaws 34, 36 away from the leg 14 to actively release the lock. An adjustment knob 50 is threadably attached to a rear end of the bar 38 and bears against the rear jaw 36. Rotation of the knob 50 in one direction draws the cam lever 40 (and the front jaw 34) toward the knob 50 (and rear jaw 36) so that the front and rear jaws are closer together in the locked position of the clamp 32. Rotation in the opposite direction moves the knob 50 and cam lever 40 farther apart, so that the front and rear jaws 34, 36 are farther apart when the clamp 32 is locked. In this way, the distance between the jaws 34, 36 when the clamp 32 is locked can be changed to adjust the clamping force applied in the locked position. It is to be understood that the knob 50 could operate to clamp and release the front and rear jaws 34, 36 without the cam lever 40, rather than merely as an adjustment device. In that configuration (not shown) the lever 40 could be removed.

Figure 23:
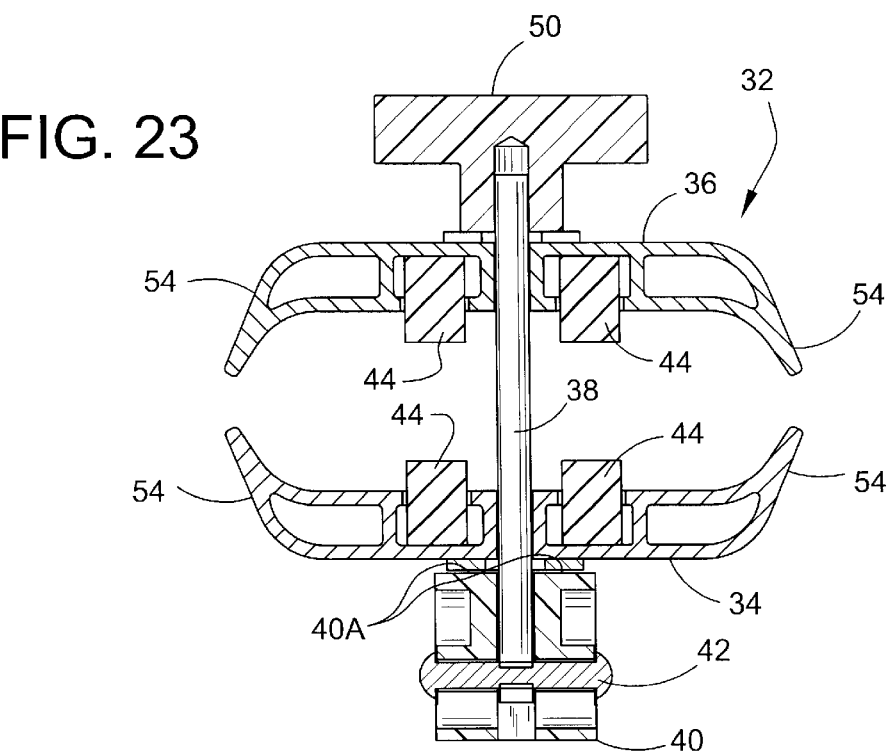
FIG. 23 is a horizontal section of the clamp of FIG. 22.

The front jaw 34 extends over the front face 46 of the telescoping leg member 18 and part way around each of the rods 28. Similarly, the rear jaw 36 extends over the rear face 48 of the telescoping leg member 18 and part way around each of the rods 28. The end portions 54 of the front jaw 34 and the rear jaw 36 are angled outwardly and function as wedges so that as the jaws are drawn together, the end portions of the jaws force the rods 28 inwardly against the telescoping leg member 18. As shown in FIG. 23, the inner surfaces of the end portions 54 have a substantial curve, corresponding to the radius of curvature of the rod 28. As a result, the jaw (34, 36) engages the rod 28 over a substantial area, not just along a line. Moreover, the center part of the jaws 34, 36 have internal webs (see FIG. 23), giving the jaw superior stiffness so there is little bending which occurs when the clamp 32 is moved to the locked position. The static friction between the rods 28 and the telescoping leg member 18 secures the telescoping leg member in position at a selected extension from the fixed leg member 16.

Figure 2:
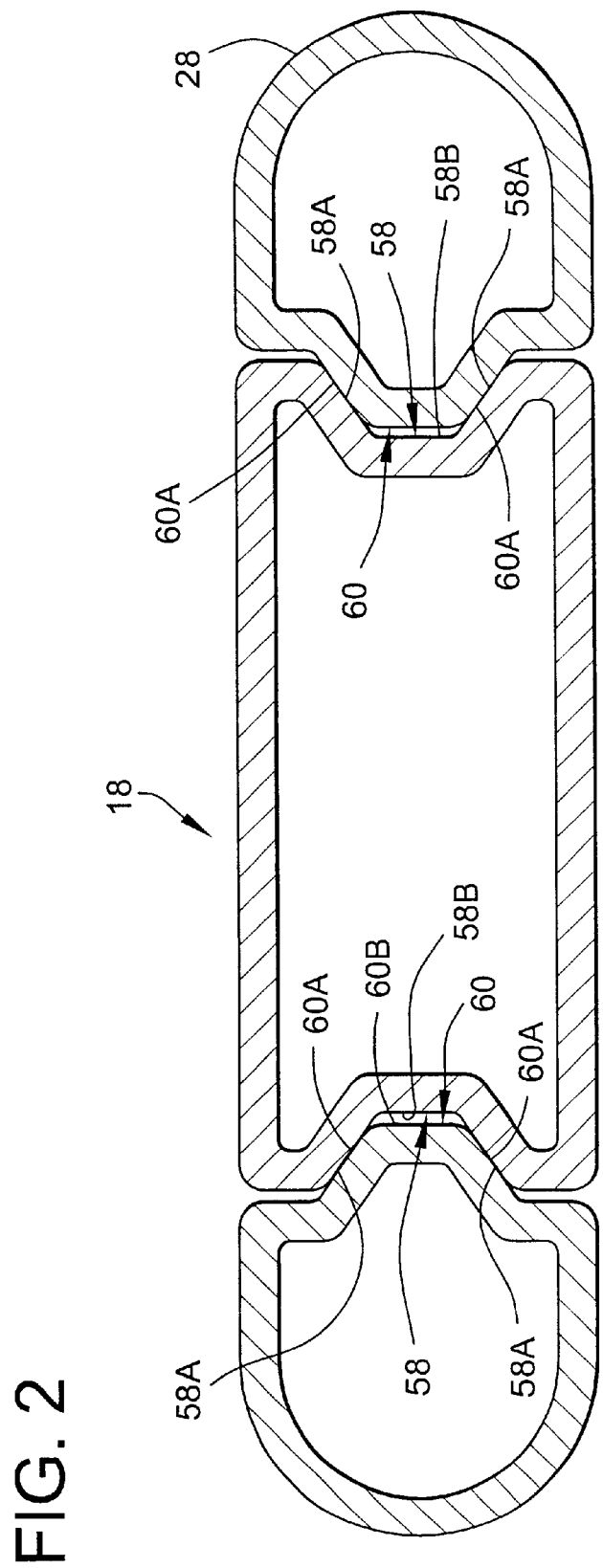
FIG. 2 is a section in the plane including line 2—2 of FIG. 1.
Figure 4:
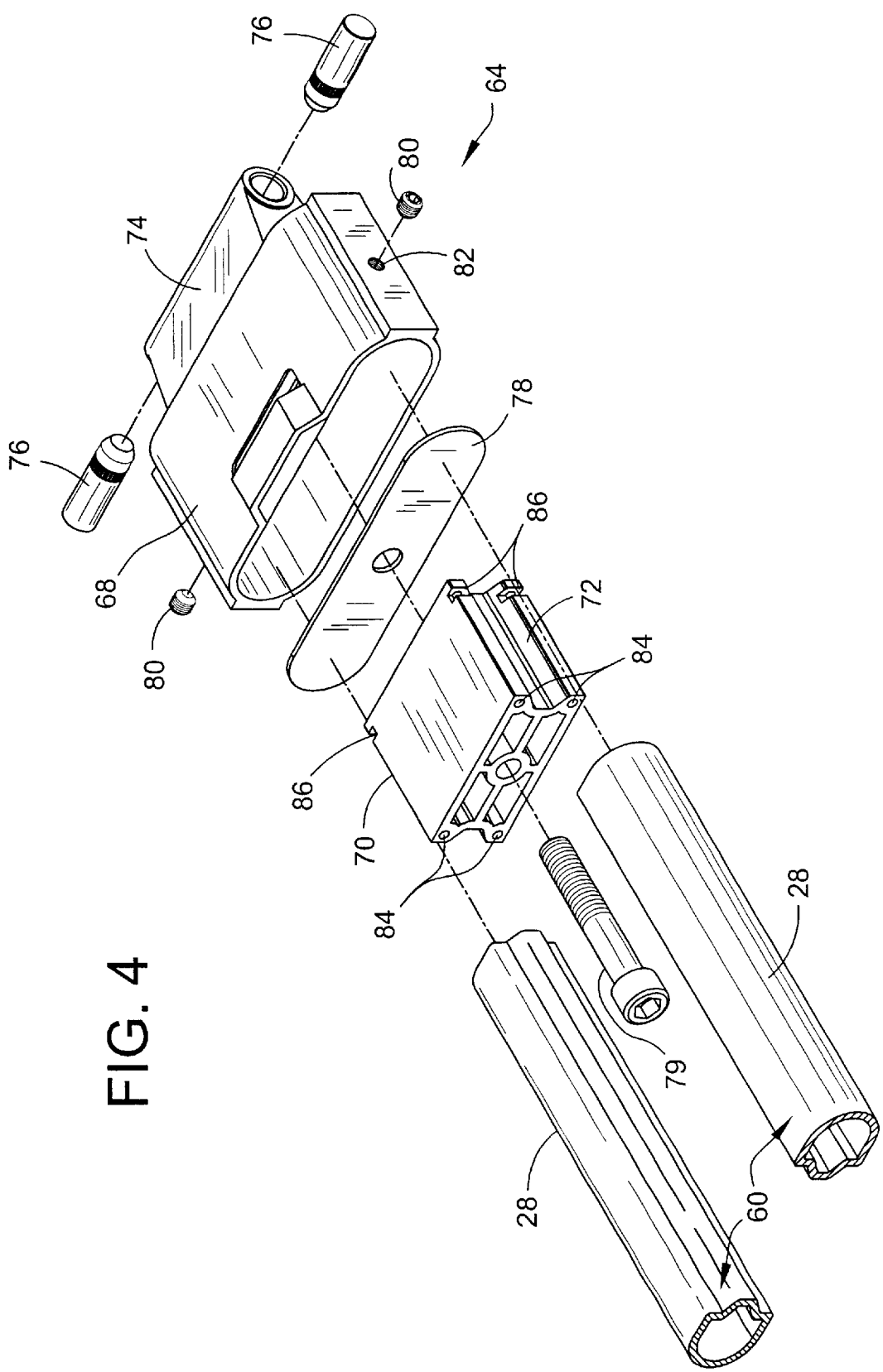
FIG. 4 is a fragmentary, exploded view of the leg of FIG. 3.

An important feature of the present invention is the construction of the rods 28 and telescoping leg member 18 which facilitates high friction interengagement of the rods with the telescoping leg member. Referring to FIG. 2, the telescoping leg member 18 is provided with a laterally outwardly opening channel (indicated generally at 58) in each of its narrow sides, extending substantially the full length of the telescoping leg member. The rods 28 each have a protrusion (generally indicated at 60) extending the full length of the rod and projecting into a respective one of the channels 58. The protrusions 60 may be on the telescoping leg member 18 and the channels 58 on the rods 28 without departing from the scope of the present invention. However, the provision of the protrusions 60 on the rods 28 as shown and described herein provides a benefit of stiffening the rods. Although less preferred, each leg could have but one rod with a protrusion and only one side of the telescoping leg member could have a channel. Each channel 58 has side walls 58A which angle toward each other to their intersection with a connecting wall 58B at the bottom of the channel so that the channel has a generally wedge shape. The protrusion 60 has a corresponding wedge shape, including side walls 60A which angle toward each other to their intersection with a connecting wall 60B away from the rod. The protrusions 60 have substantially the same shape as the channels 58 and are received in the channels thereby attaching the telescoping leg member 18 to the fixed leg member 16.

The shape of each channel 58 and the protrusion 60 facilitate tight, high friction engagement of the rods 28 and the telescoping leg member 18 when the clamp 32 is in the locked position. The wedge configuration of the side walls 58A of the channel 58 and side walls 60A of the protrusion 60 naturally centers the protrusion in the channel as an inward, squeezing force is applied by the end portions 54 of the clamp 32. As a result, both side walls 60A of the protrusion 60 remain engaged with respective side walls 58A of the channel 58. Moreover, the engagement occurs over substantially the full surface area of the protrusion side wall 60A which is received in the channel 58 because the side walls 58A, 60A are parallel. In the illustrated embodiment, the side walls 58A, 60A make an angle with respect to the connecting surfaces 58B, 60B of about 35°. The angle may be other than described without departing from the scope of the present invention, but in the particular embodiment illustrated, this angle provides for the clamping force needed for the travel (e.g., approximately 0.020–0.022 inches of travel) of the rods 28 inward toward the connecting surface 58B of the channel when the clamp 32 is locked. The protrusion 60 and channel 58 are shaped so that the connecting wall 60B of the protrusion will not engage the connecting wall 58B of the channel and the protrusion will not bottom out in the channel. In the illustrated embodiment, the connecting wall 60B of the protrusion is somewhat wider (e.g., about 0.060 inches wider) than the connecting wall 58B of the channel to inhibit engagement of the connecting walls. Engagement over a relatively large area of the side walls 58A, 60A increases the total friction force resisting longitudinal movement of the telescoping leg member 18 relative to the fixed leg member 16 when the clamp 32 is locked. Moreover, as the clamping force is increased and the protrusions 60 are pushed farther into the channels 58, more total surface area of the side walls 58A, 60A is engaged, further enhancing the static friction. Friction is preferably further enhanced by treating the side walls 60A of the protrusions 60 and the side walls 58A of the channels 58 for increased frictional interengagement. Treatment can be accomplished in a suitable manner, such as by abrading, chemical treatment or controlling the composition of the composite at the protrusion 60 and channel 58 used to form the telescoping leg member 18 and the rod 28.

The rods 28 are held in a hinge (generally indicated at 64) of the fixed leg member 16 so that in absence of the clamping force they are spaced with respect to the telescoping leg member 18 so that the telescoping leg member may slide easily with respect to the rods. Preferably, a stop (not shown) is provided to prevent the telescoping leg member 18 from retracting to a position where it engages the hinge 64, thereby avoiding a pinch point. The protrusions 60 are located in the channels 58 even in the unlocked position of the clamp 32, but without any significant normal force between the side walls 58A, 60A so there is little friction. The only place the rods 28 are rigidly held is in the hinge 64. The free ends of the rods 28 are received in a fixture 66, but the fixture operates only to limit movement of the rods apart from each other. Because the rods 28 are substantially fixed at their upper ends and free at their lower ends, the clamp 32 applies a moment to the rods in the locked position so that the free lower ends move first against the telescoping leg member 18 the when the clamp is moved to the locked position. Clamping engagement progresses upward from the free ends of the rods 28. This helps to ensure that nearly the entire lengths of the protrusions 60 come into engagement with the channel side walls 58A, maximizing the overall surface area of engagement and the friction force. The rods 28 are biased to move away from the telescoping leg member 18 when the clamping force is released and aid in freeing the telescoping leg member for sliding movement. It is also envisioned that a spring (not shown) could be mounted on each rod 28 near the bottom to assist in moving the rods away from the telescoping member when the clamp 32 is unlocked.

The construction of the upper end of the fixed leg member 16 is illustrated in FIGS. 3–6. The rods 28 of the fixed leg member 16 are received in a die cast aluminum housing 68 of the hinge 64 against an extruded aluminum locating block 70 which establishes the lateral (relaxed) spacing and parallel relationship of the rods important to the correctly engage the side walls 58A, 60A of the channel 58 and rods 60. To simplify the illustration of the connection of the rods 28 in the hinge housing 68 of FIG. 5, the rods have not been shown in cross section. The locating block 70 has channels 72 similar to the channels 58 of the telescoping leg member 18, except that they are wider so that each rod engages the block outside the channel adjacent to the protrusion 60, fixing the lateral location of the rod. The locating block 70 also locates the rods 28 about their longitudinal axes and holds the rods from twisting about their axes, for alignment with the side walls 60A of the protrusions 60 with the side walls 58A of the channels 58. The rods 28, housing 68 and locating block 70 are held together as a unit by a flowable, thermosetting adhesive which substantially fills the housing. The rods 28, housing 68 and locating block 70 are sized so that the spacing in many areas closely corresponds to an optimal bondline thickness for the adhesive to maximize the bonding. Unitizing the rods 28, housing 68 and locating block 70, as that term is used herein, means that these pieces within the housing act as a single piece of material so that, for instance, forces applied to the hinge 64 are immediately transferred through the entire hinge and not taken up by relative movement of these parts within the housing. An arm 74 extending up from the top of the housing 68 holds a pair of hinge pins 76 used to pivotally attach the leg 14 to the head 12 of the tripod 10, as will be described hereinafter.

It is envisioned that a center leg member could be attached to the hinge and two rods on the side of the center leg member could be fixed in a foot (not shown). In that event a locating block would preferably be provided in the foot, rather than in the hinge to establish the spacing of the rods. The center leg member would be the "fixed leg member" and the rods would constitute the "telescoping leg member" in that embodiment.

Figure 5:
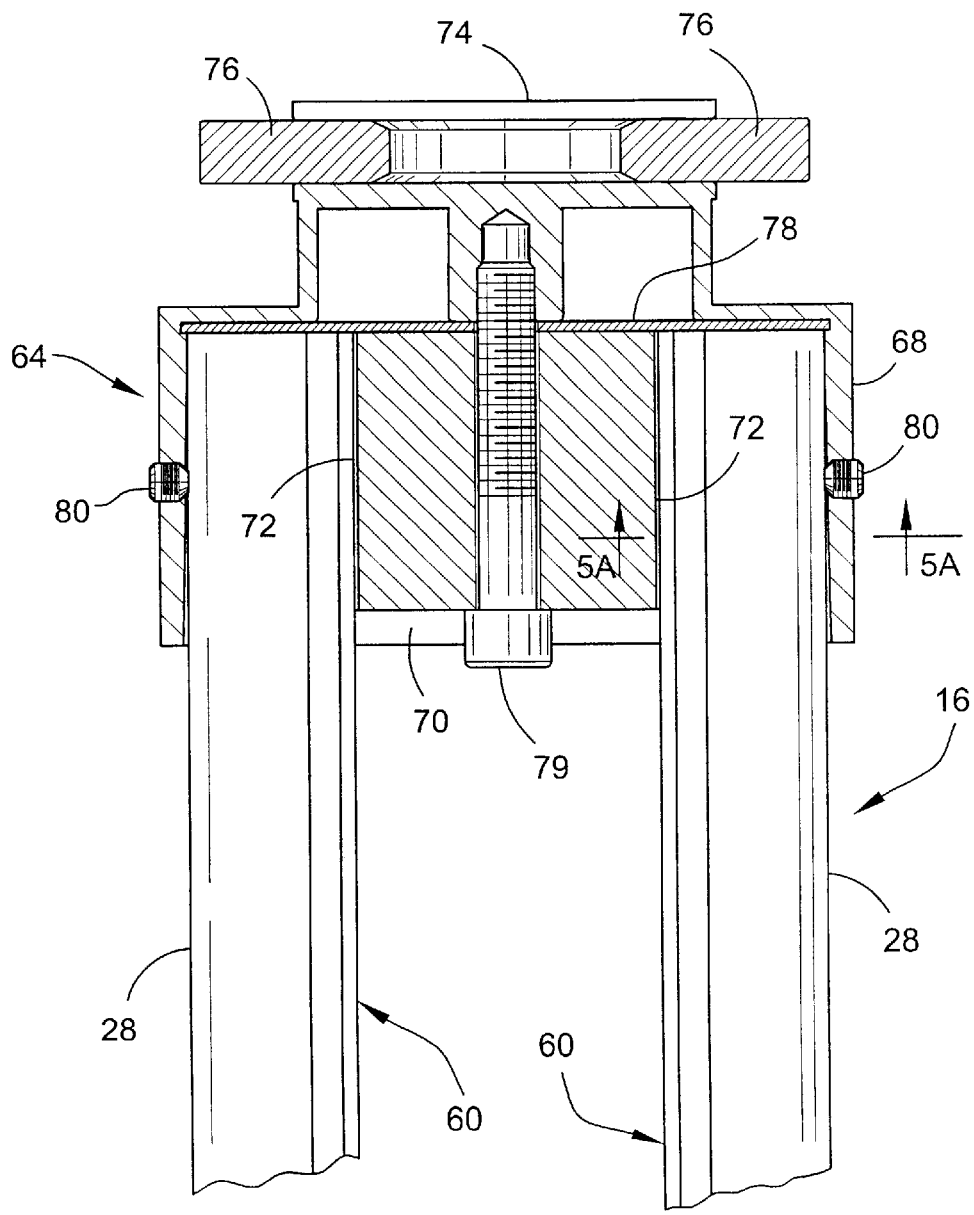
FIG. 5 is a transverse section of the upper end of the leg.
Figure 5A:
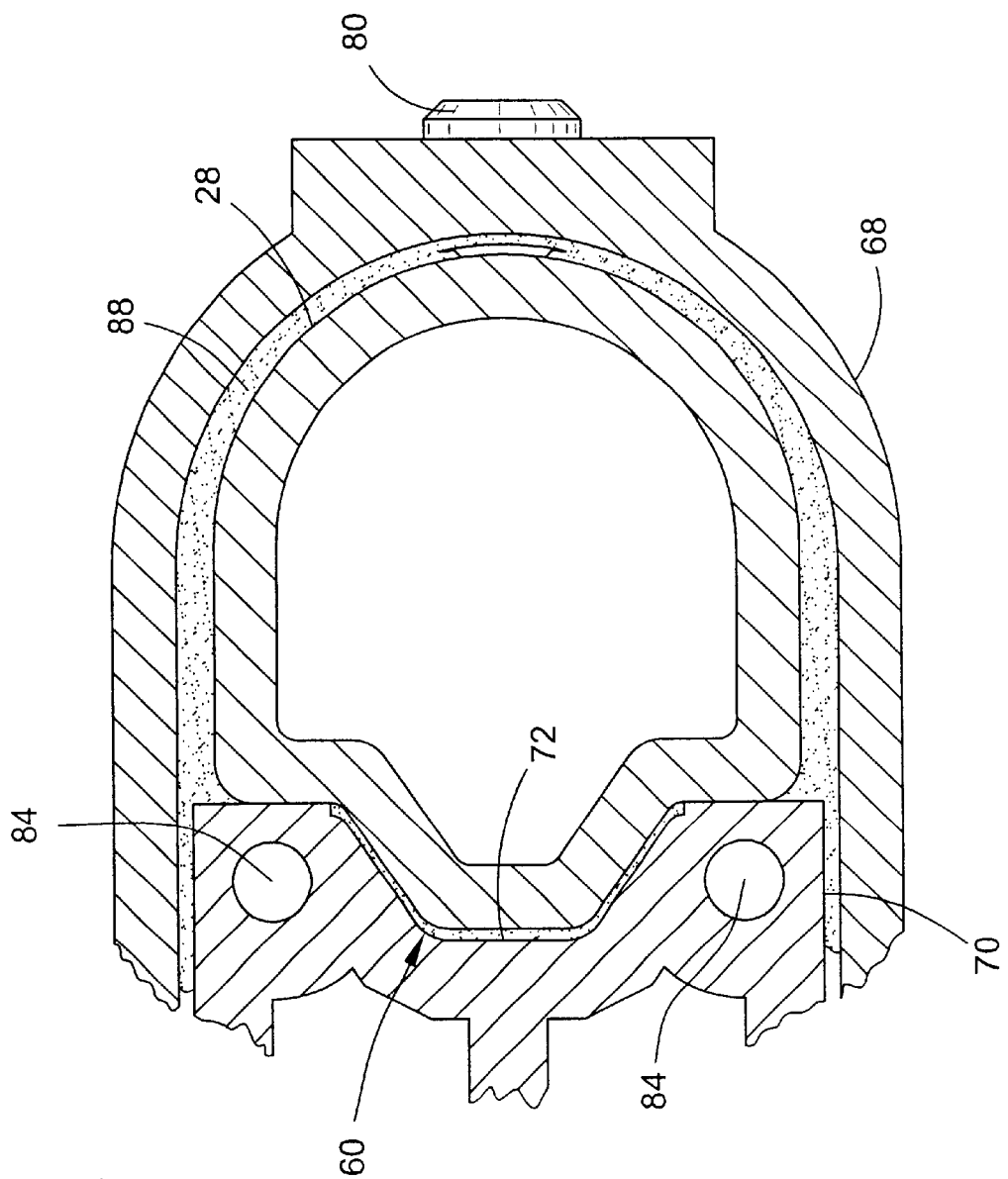
FIG. 5A is a fragmentary section taken in the plane including line 5A—5A of FIG. 5.
Figure 6:
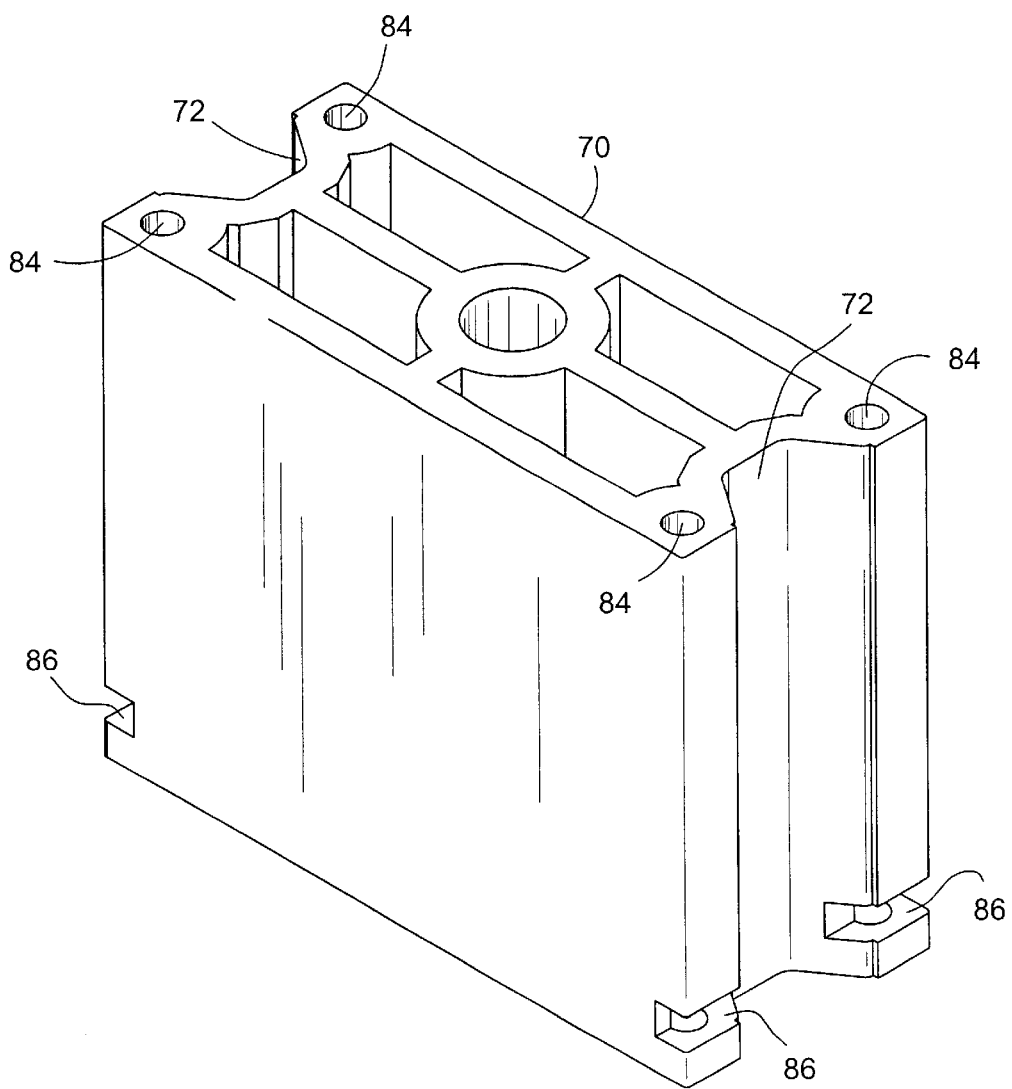
FIG. 6 is a perspective of a locating block.

Assembly of the rods 28 with the hinge 64 is accomplished by securing the locating block 70 in the housing 68 against a backing plate 78 with a bolt 79. The rods 28 are inserted between the locating block 70 at the adjacent side of the housing 68 on respective sides of the locating block. Set screws 80 threaded through holes 82 in the ends of the housing 68 are tightened to push the rods 28 against the locating block 70. Wedges (not shown) could be used in place of the set screws 80 to push the rods 28 against the locating block 70. The rods 28 are not restrained in any way except by the action of the set screws 80 so that the rods are fixed in position against the locating block 70 without any stress within the rods. Preferably, this assembly process is carried out with the housing 68 inverted so that the rods 28 are inserted down into the housing. Adhesive 88 (see FIG. 5A) is injected through passages in the locating block 70 which open at ports 84 in the bottom of the block and at outlets 86 in the channels 72 (FIG. 6). Injected adhesive flows from the port 84 through the passage and through the outlet 86 into the housing 68, filling all of the space in the housing between the housing, locating block 70 and rods 28 (see FIG. 5A). The passage may be equipped with a valve (not shown) to prevent back flow of the adhesive 88. Inversion of the housing 68 facilitates keeping the adhesive 88 within the housing until it hardens. Filling from near the bottom of the inverted housing 68 helps to avoid air gaps in the adhesive 88 which reduce bond strength. Once the adhesive hardens, the housing 68, locating block 70 and rods 28 function as a unitary piece. Lateral loads on the hinge 64, such as may be experienced when surveying equipment powered by motors turns on the head 12 or during transport and handling of the tripod 10, are resisted by the hinge as a unit. The legs 14 do not tend to move or become permanently displaced relative to each other in the fashion of a parallelogram linkage under lateral loads applied to the leg.

Figure 6A:
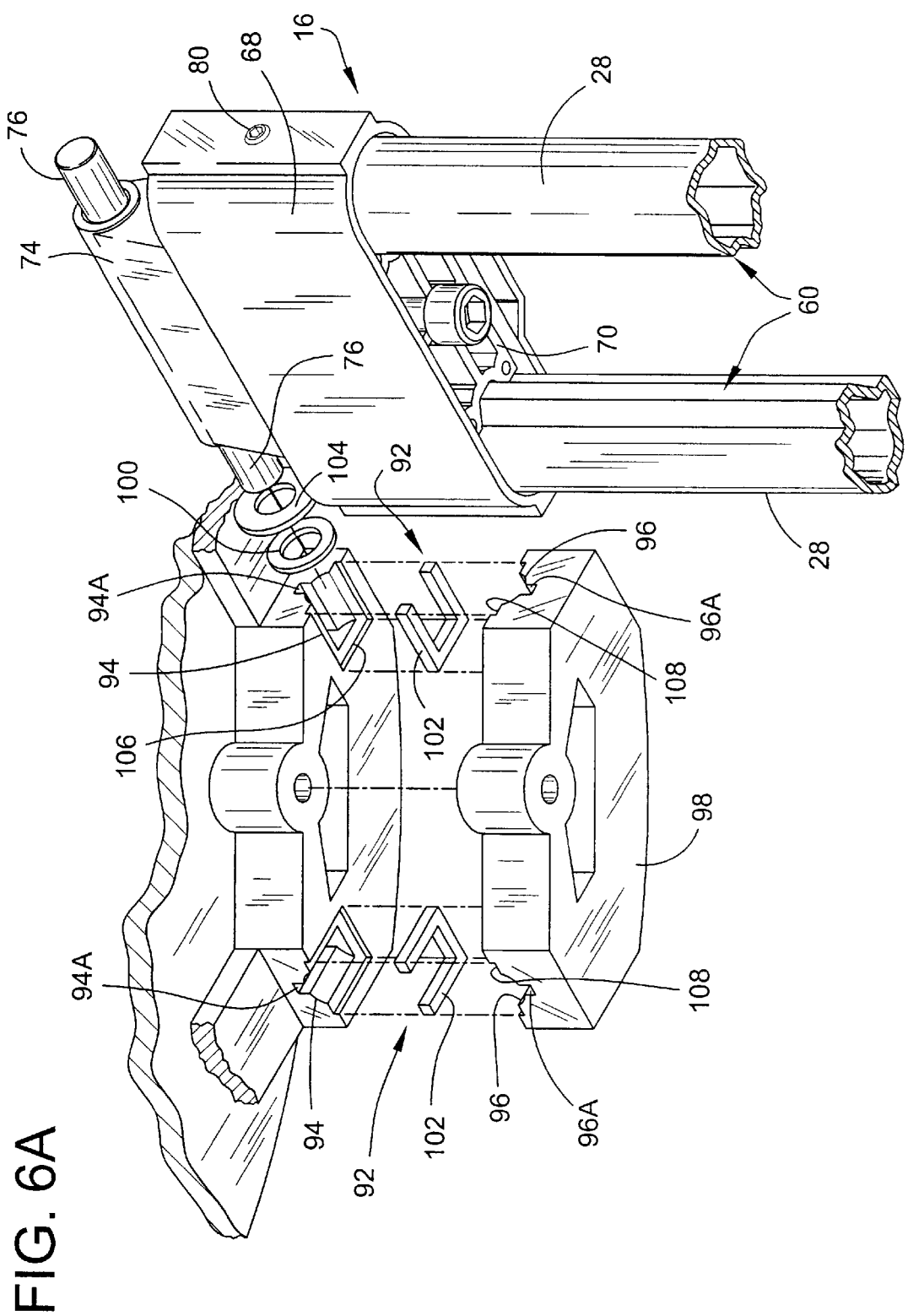
FIG. 6A is a fragmentary perspective of one of the legs and a head of the tripod with the leg exploded from the head.

Connection of the leg 14 to the head 12 is accomplished by placement of each of the hinge pins 76 projecting laterally from the hinge 64 into a respective hinge pin receptacle (generally indicated at 92) on the underside of the head (FIG. 6A). The head 12 and the hinge pins 76 are preferably made of metal, at least in the region where contact occurs. As so connected, the legs 14 are capable of swinging with respect to the head 12 between the use position and the collapsed position, yet are of extremely close and precise dimensional fit in order to reduce play and provide stability. Each hinge pin receptacle 92 comprises an upper portion 94 which opens downwardly from the underside of the head 12, and a lower portion 96 which opens upwardly from a retainer plate 98 attached to the underside of the head. Both the upper portion 94 and the lower portion 96 also open laterally at one end. The upper and lower portions 94, 96 are each generally semi-cylindrical in shape, but have a channel (designated 94A, 96A, respectively) at the bottom so that each portion has a roughly Y shape cross section. The channels 94A, 96A help to prevent line contact of the hinge pin 76 in the receptacle 92, and accommodate wear.

When the retainer plate 98 is attached to the head 12 to mate the upper and lower portions 94, 96 of the receptacle 92, they form a cylinder having a lateral opening and sized to receive the hinge pin 76 to mount the hinge pin on the head. The hinge pin 76 is sealed in the receptacle by an annular gasket 100 and a U-shaped gasket 102. The annular gasket 100 fits around the hinge pin 76 against a washer 104 which abuts the arm 74 holding the hinge pin. The annular gasket 100 engages the head 12 adjacent the upper portion 94 of the receptacle 92 and engages the retainer plate 98 adjacent the lower portion 96. Thus, entry into the receptacle 92 from the side around the hinge pin 76 is blocked by the annular gasket 100. The U-shaped gasket 102 seals the receptacle 92 between the head 12 and the retainer plate 98. More specifically, the U-shaped gasket 102 is received in a correspondingly U-shaped recess 106 around the upper portion 94 of the receptacle, and in another U-shaped recess 108 around the lower portion 96. Thus, the U-shaped gasket 102 seals the receptacle 92 between the head 12 and the retainer plate. The free ends of the U-shaped gasket 102 extend to the lateral opening of the receptacle 92 through which the hinge pin 76 extends into the receptacle, and against the annular gasket 100 to complete the seal. The annular gasket 100 and the U-shaped gasket 102 cooperate to hold lubricant in the receptacle 92 and to keep out any debris which could damage the extremely close and precise hinge connection upon pivoting the leg 14 on the hinge pin 76, causing play at the hinge 64 and loss of stability for the tripod 10.

Figure 8:
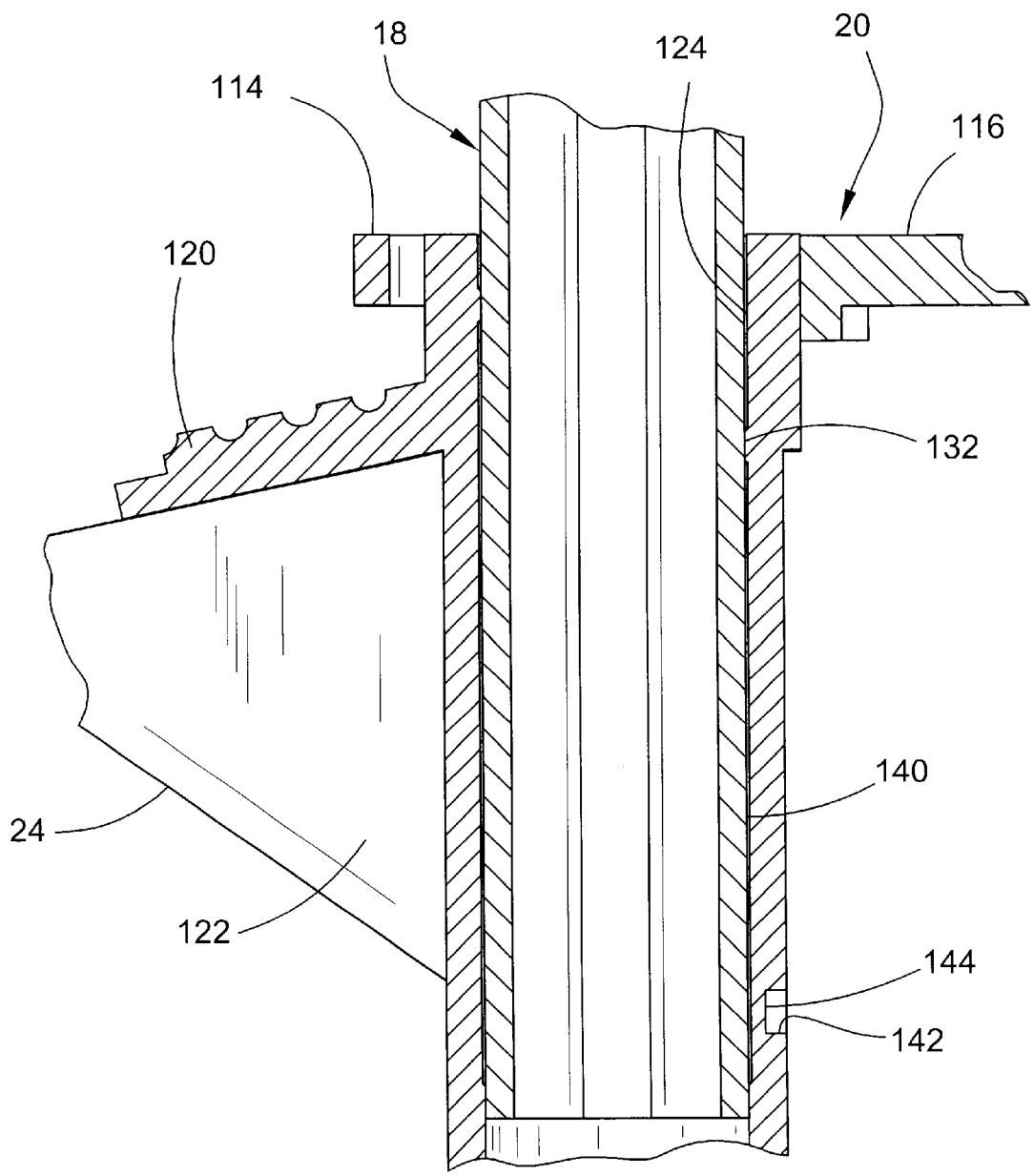
FIG. 8 is a fragmentary vertical section of the foot.

Referring now particularly to FIGS. 7–9, the foot 20 includes a body 112 molded from a polycarbonate material, and the steel point 22 is attached by threads in an opening of a metal threaded insert (not shown) molded in the body. Molded together with the body 112 are the pedal 24, a ring 114 on the front side of the feet 20, a catch 116 and a snap connector 118. The pedal 24 has a foot engagement portion 120 with a ridged upper surface to inhibit slipping when the pedal 24 is being used to push the point 22 into the ground, and a gusset 122 extending from the engagement portion to the body 112 for strength. The operation of the snap connector 118 and catch 116 will be described hereinafter. A plane including the surface of the foot engagement portion 120 is perpendicular to the axis of the point 22. Thus, force applied to the pedal 24 by pushing on the engagement portion 120 is applied parallel to the axis of the point 22.

The body 112 of the feet 20 has a cavity 124 which receives the lower end of the telescoping leg member 18, as shown in FIG. 8. In order to get the body 112 out of the mold it is necessary that the cavity 124 flare outwardly toward its open upper end. However, the extruded telescoping leg member 18 is not flared. The flare of the cavity 124 is so slight as not to be apparent in the drawings, but it is sufficient to prevent the telescoping leg member 18 from contacting the sides of the cavity everywhere. Referring to FIG. 9, the cavity 124 has a constricted portion 126 near the bottom of the cavity which is defined between an angled transition surface 128 and a seat 130 which engages the end of the telescoping leg member 18 and fixes the distance of insertion of the leg member into the feet 20. Nubs 132 formed on the interior of the cavity 124 engage the telescoping leg member 18 to help locate it laterally and maintain a desired spacing between the telescoping leg member and cavity side walls. The angled transition surface 128 located between the upper part of the cavity 124 and the seat 130 helps to guide the telescoping leg member 18 onto the seat. The constricted portion 126 of the cavity 124 (the volume between the angled transition surface and the seat) is laterally dimensioned so that there is a tight, sealing fit of the telescoping leg member 18 around its entire periphery. The cavity 124 continues below the seat 130 where crossed bracing walls 134 extending between sides of the cavity. The tops of the bracing walls 134 are generally flush with the seat 130. Side walls 136 curved in correspondence with the exterior shape of the feet 20 extend down to a flat bottom wall 138 of the cavity 124. The bracing walls 134 break up the bottom wall 138 into four sections which appear in FIG. 9 (generally) as quadrants of an ellipse.

The telescoping leg member 18 is secured to the feet 20 by an adhesive 140 which fills the space between the telescoping leg member and the cavity walls above the angled transition surface 128 (FIG. 8). The spacing of the telescoping leg member 18 and the sides of the cavity 124 is controlled so that an optimum range of bondline thicknesses for the adhesive 140 can be achieved for superior bonding. The engagement of the telescoping leg member 18 in the constricted portion 126 locates the leg member and feet 20 with respect to each other. The adhesive 140, which surrounds the telescoping leg member 18 in the cavity 124, fixes the telescoping leg member and feet 20 relative to each other in the desired location against the forces applied to the telescoping leg member and foot in use of the tripod 10.

In assembly, the lower end of the telescoping leg member 18 is inserted into the cavity 124 and pressed into the constricted portion 126 into engagement with the seat 130, sealing the telescoping leg member and feet 20 around the periphery of the leg member. Referring now also to FIG. 9B, a flowing, thermosetting adhesive 140 is injected into the cavity 124 of the feet 20 through a port 142 by a nozzle N (shown schematically). Filling from near the bottom of the cavity 124 helps to avoid air bubbles in the adhesive 140 detrimental to bonding. A valve in the form of a flap 144 at the inner end of the port 142 inhibits back flow of adhesive 140 out of the cavity 124. When the nozzle N is inserted into the port 142 and adhesive 140 is forced from the end of the nozzle N, the flap 144 is pushed in and adhesive flows into the cavity 124. The seal of the telescoping leg member 18 with the feet 20 in the constricted portion 126 of the cavity 124 prevents the adhesive 140 from entering the constricted portion, but all parts of the cavity not already filled by the telescoping leg member are filled by the adhesive. The flap 144 is formed from the material of the body 112 and has sufficient rigidity to resist back flow through the port 142 after the nozzle N is removed and before the adhesive 140 has hardened.

Figure 10:
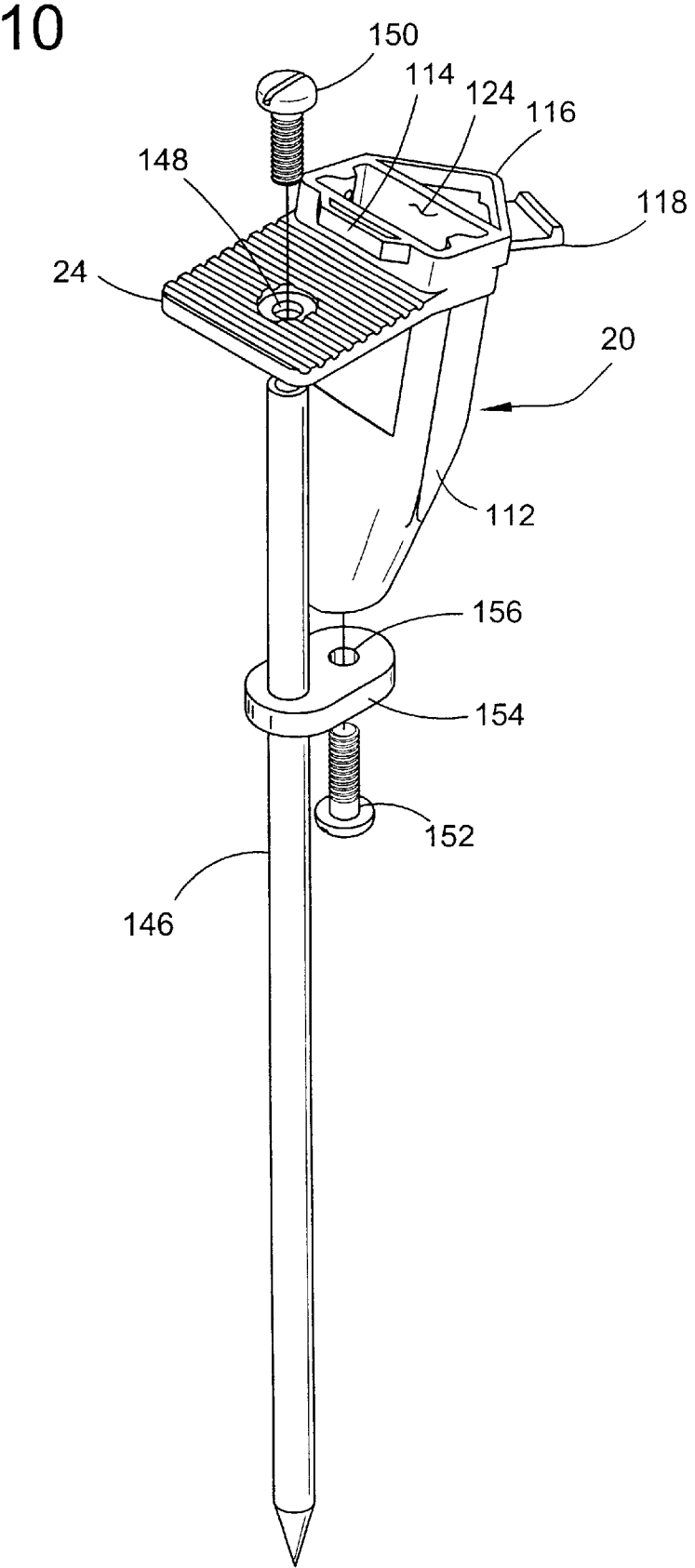
FIG. 10 is a perspective of the foot with an attachable accessory shown exploded from the foot.
Figure 10A:
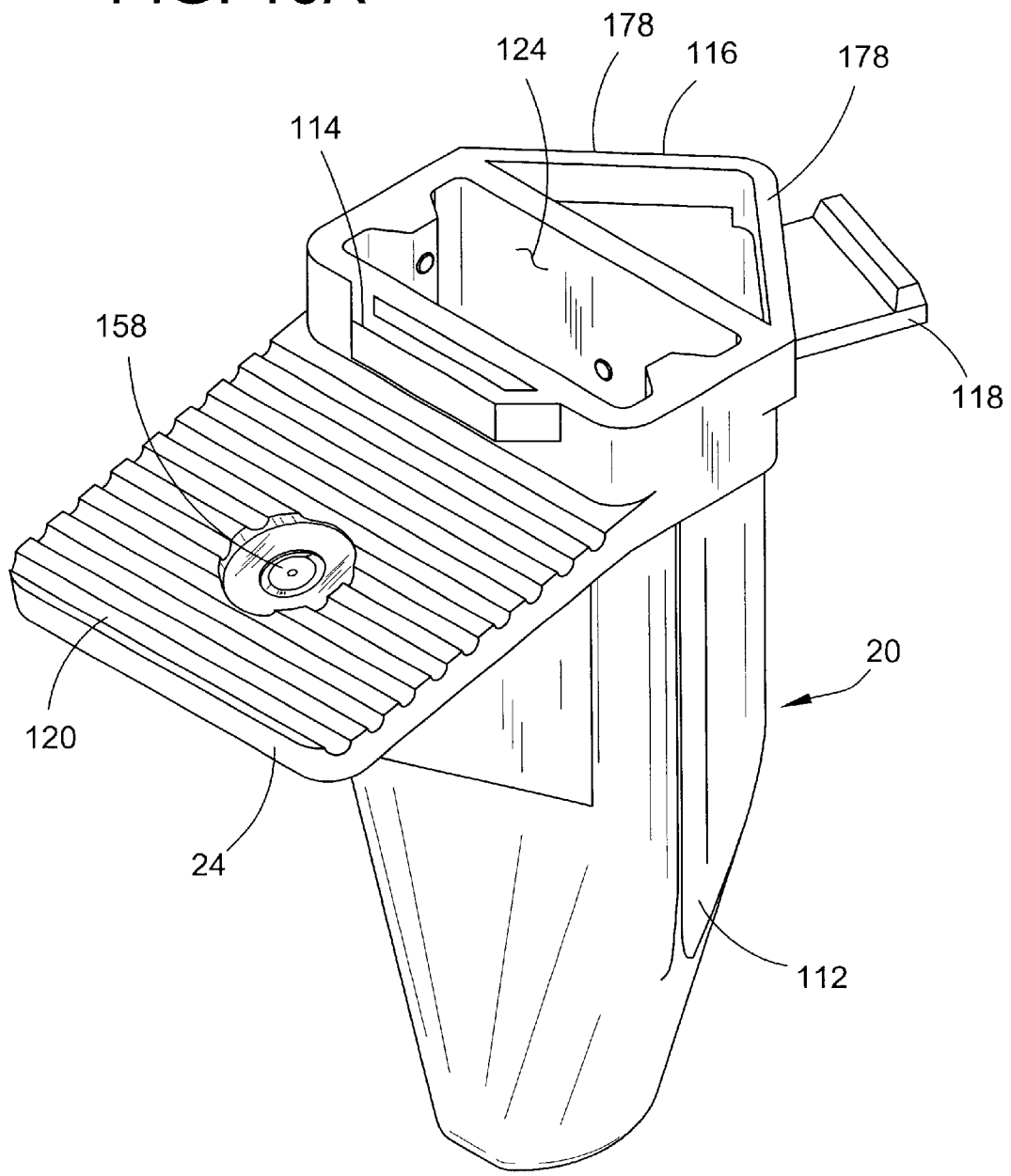
FIG. 10A is a perspective of a modified foot including a plug covering an opening in a pedal of the foot.
Figure 10B:
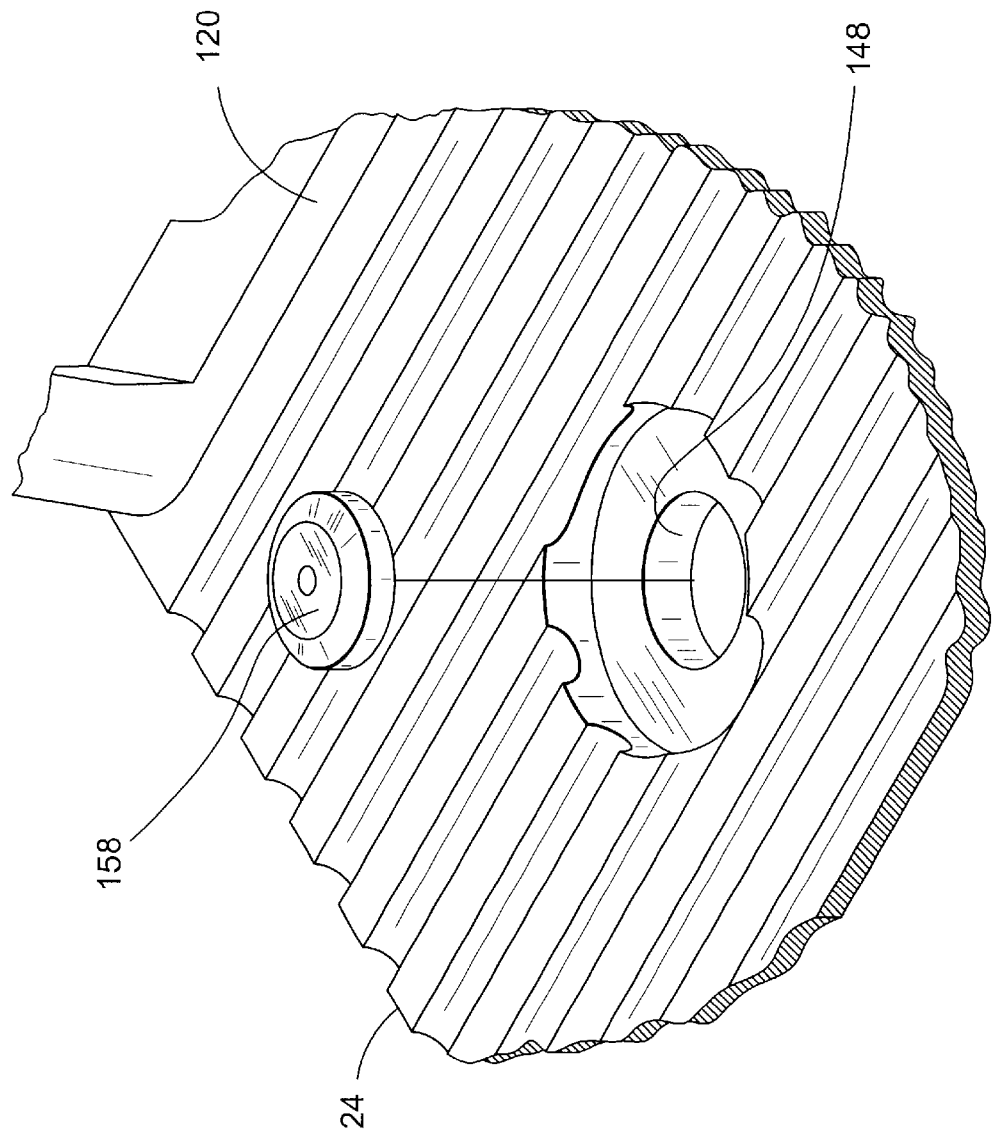
FIG. 10B is an enlarged fragment of the foot of FIG. 10A showing the plug exploded from the pedal.

The feet 20 of the tripod 10 are each capable of mounting accessories so that it is never necessary to remove the foot from the leg 14. At least some of these accessories are alternative structures to the steel point 22 for engaging the ground. An example of one such structure, a long spike 146 for use in softer soil conditions, is shown in FIG. 10. The spike has a suitable length for the particular soil condition, for example in the range of about 6 inches to 36 inches. Other lengths are possible. Examples of other accessories of this type (not shown) would be a foot having a flat surface engaging surface and a caster. The foot 20 is capable of attaching the spike 146 (or other accessories such as wheeled casters) in two locations for securely holding the spike. In that regard, the foot engagement portion 120 of the pedal 24 has a hole 148 in it for receiving a fastener, such as bolt 150, for attaching the upper end of the spike 146 to the pedal. The steel point 22 can be unthreaded from the bottom of the foot 20 so that the threaded insert (not shown) can receive another bolt 152 to secure a mounting tab 154 on the bottom of the foot. The mounting tab 154 extends outwardly from the bottom of the feet 20 generally under the hole 148 in the pedal 24, and has an aperture 156 through which the spike 146 extends. A somewhat different form of the foot 20 is shown in FIGS. 10A and 10B to include a plug 158 which closes the hole 148 in the foot engagement portion 120 of the pedal 24 when not needed. The plug 158 is frangibly attached to the pedal in the hole 148, closing the hole. As shown in FIG. 10B, the plug 158 can be broken away from the hole 148 when needed for attaching an accessory. Alternatively, the plug 158 can be provided with a starter hole to facilitate drilling out the opening 148.

Figure 11:
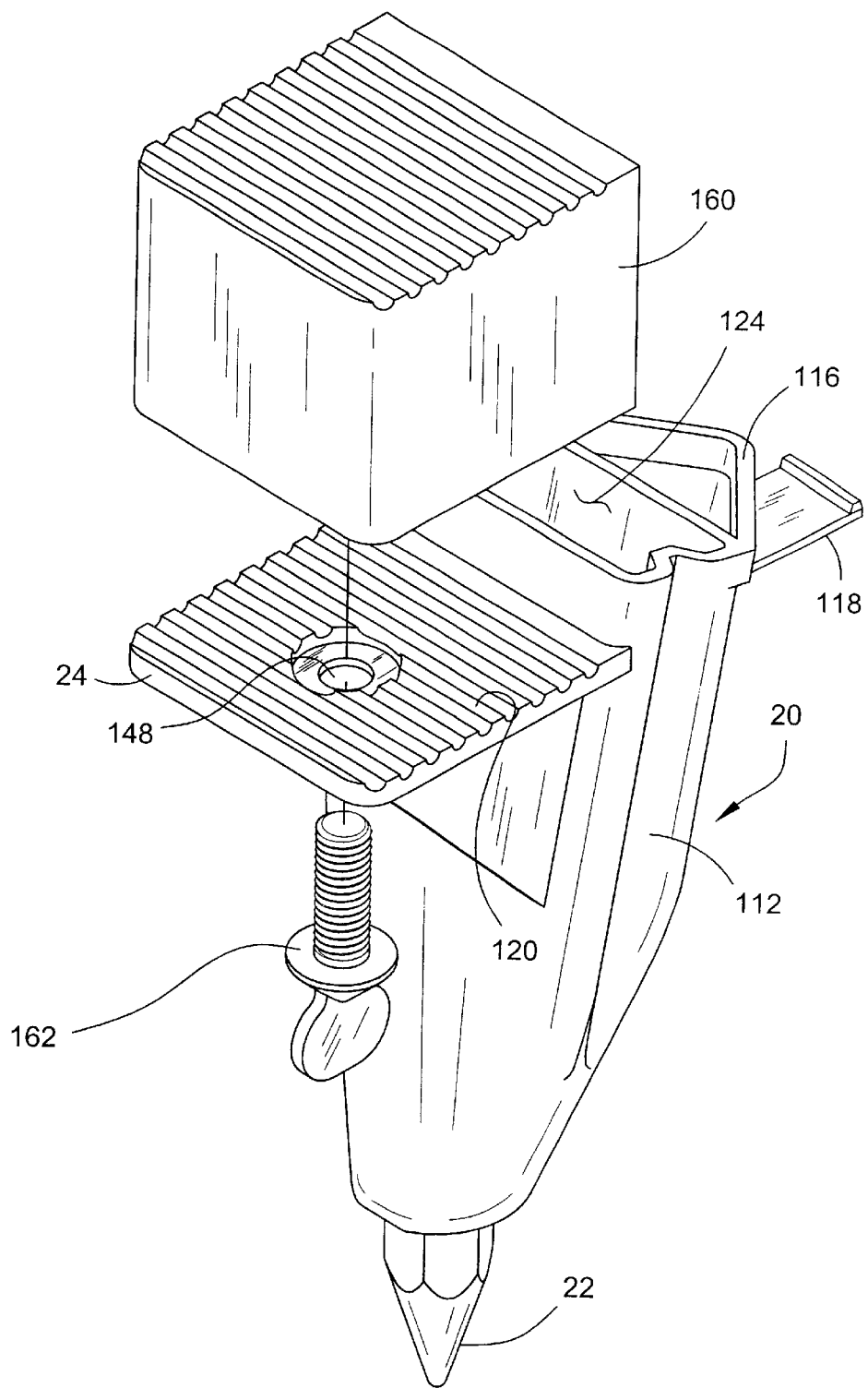
FIG. 11 is a perspective of the foot showing a weight block exploded from the foot.
Figure 12:
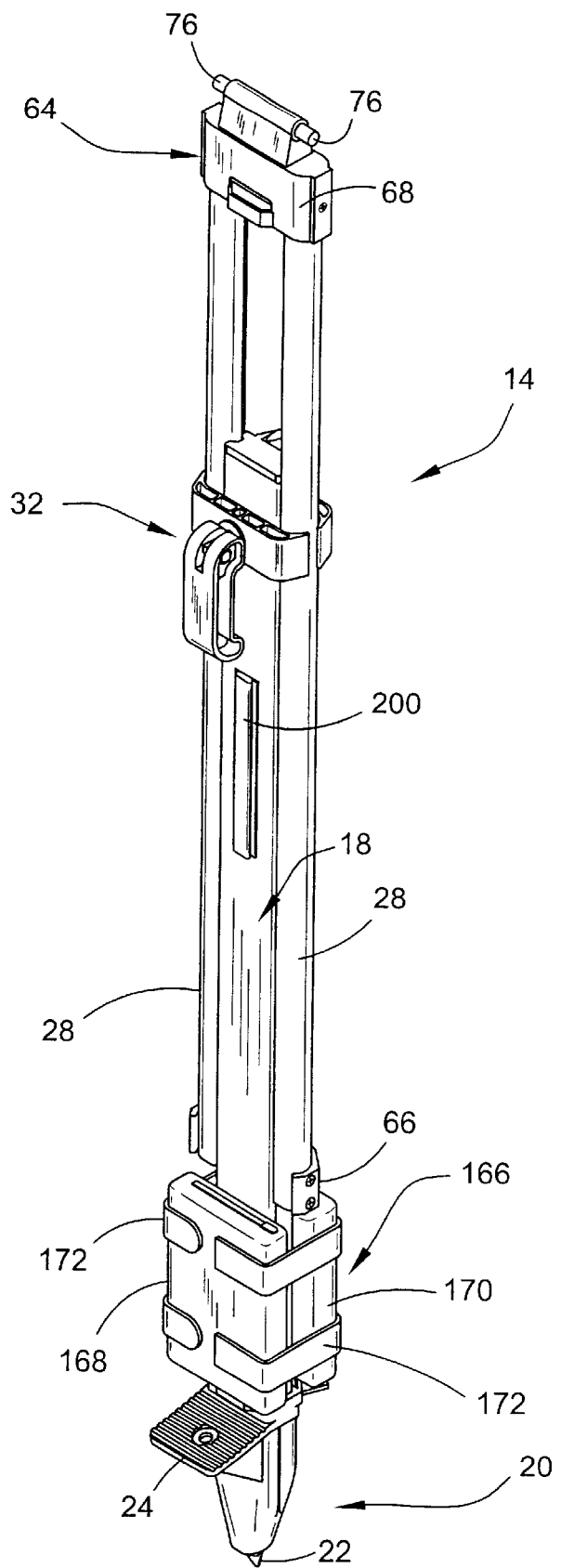
FIG. 12 is a perspective of one of the legs of the tripod having a leg weight attached thereto.
Figure 13B:
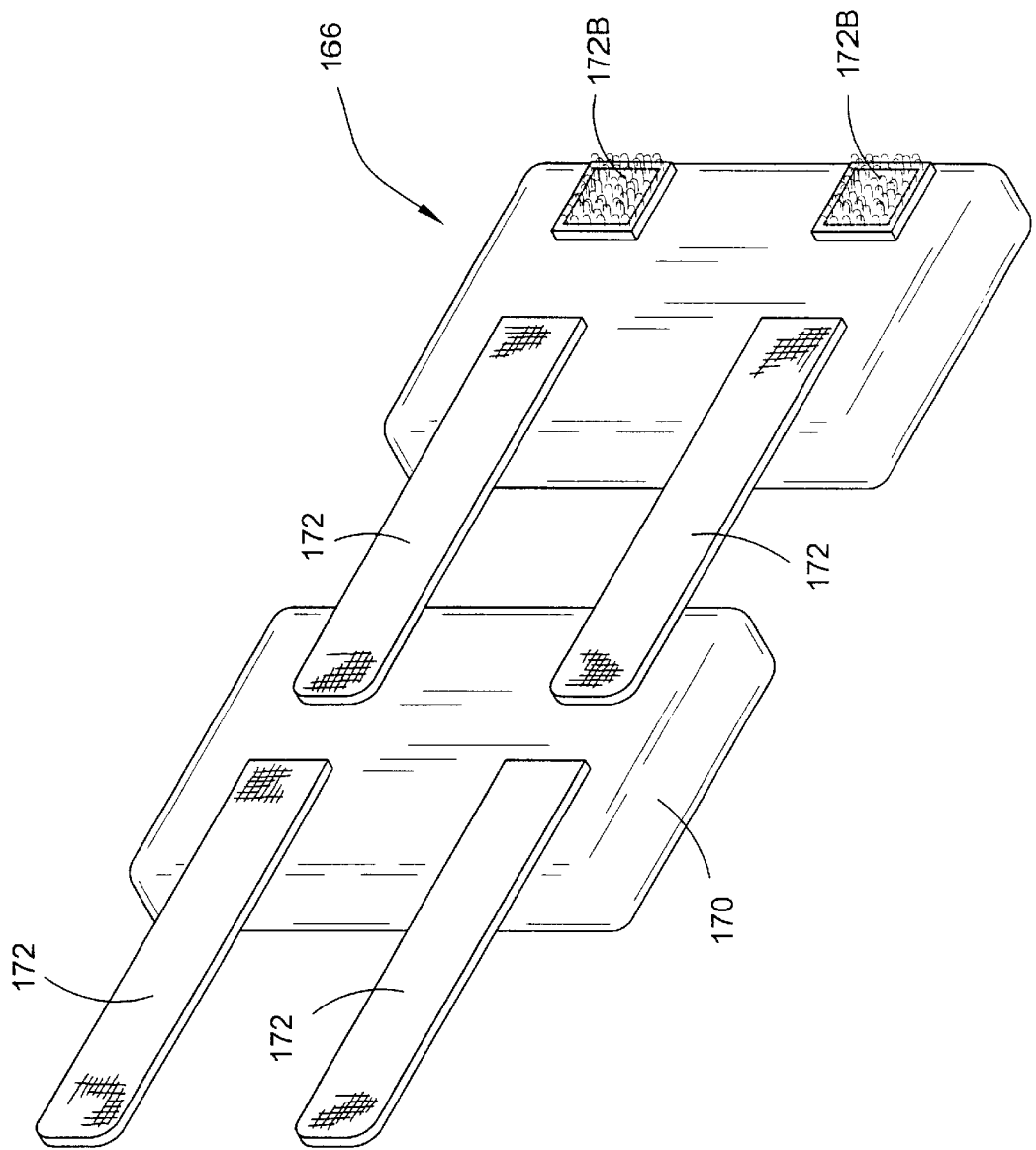
FIG. 13B is a perspective of the leg weight laid out flat, from the rear of the leg weight.

Other accessories could be attached to the foot 20 without removal of the steel point 22. For instance in FIG. 11, a weight block 160 which can be attached by a bolt 162 using the hole 148 in the pedal 24 is shown. The weight block 160 can help to stabilize the tripod 10, such as in high wind conditions. A different leg weight (indicated generally at 166) is illustrated in FIGS. 12–13B can be employed which does not require any particular structure on the tripod 10. The leg weight 166 comprises a first ballast container 168, a second ballast container 170 and flexible straps 172 connected to both containers. Separate pairs of straps 172 connect the first and second containers 168, 170 together and extend away from the second container. It is envisioned that additional ballast containers (not shown) could be provided to increase the overall mass of the leg weight 166. As shown in FIG. 12, the first and second ballast containers 168, 170 can be positioned on the front and rear faces 46, 48 of the telescoping leg member 18 opposite each other. The straps 172 extend around the telescoping leg member 18 with the free ends of the pair extending away from the second ballast container 170 having pieces 172A of hook and loop fastener material engageable with corresponding pieces 172B of hook and loop fastener material on the first ballast container 168. Thus, the leg weight 166 is capable of holding itself in self-retaining position on the leg 14. Each of the ballast containers 168, 170 has a zipper 174 (or other suitable closure) on its top which can be opened to permit passage of ballast material into the container. The container (168 or 170) can be filled with sand or other material available at the site where surveying is to be done. It is not necessary to transport ballast to the site, so the leg weight 166 is light to carry. However, it is envisioned that the containers 168, 170 could be replaced with permanent ballast without departing from the scope of the present invention.

Figure 14:
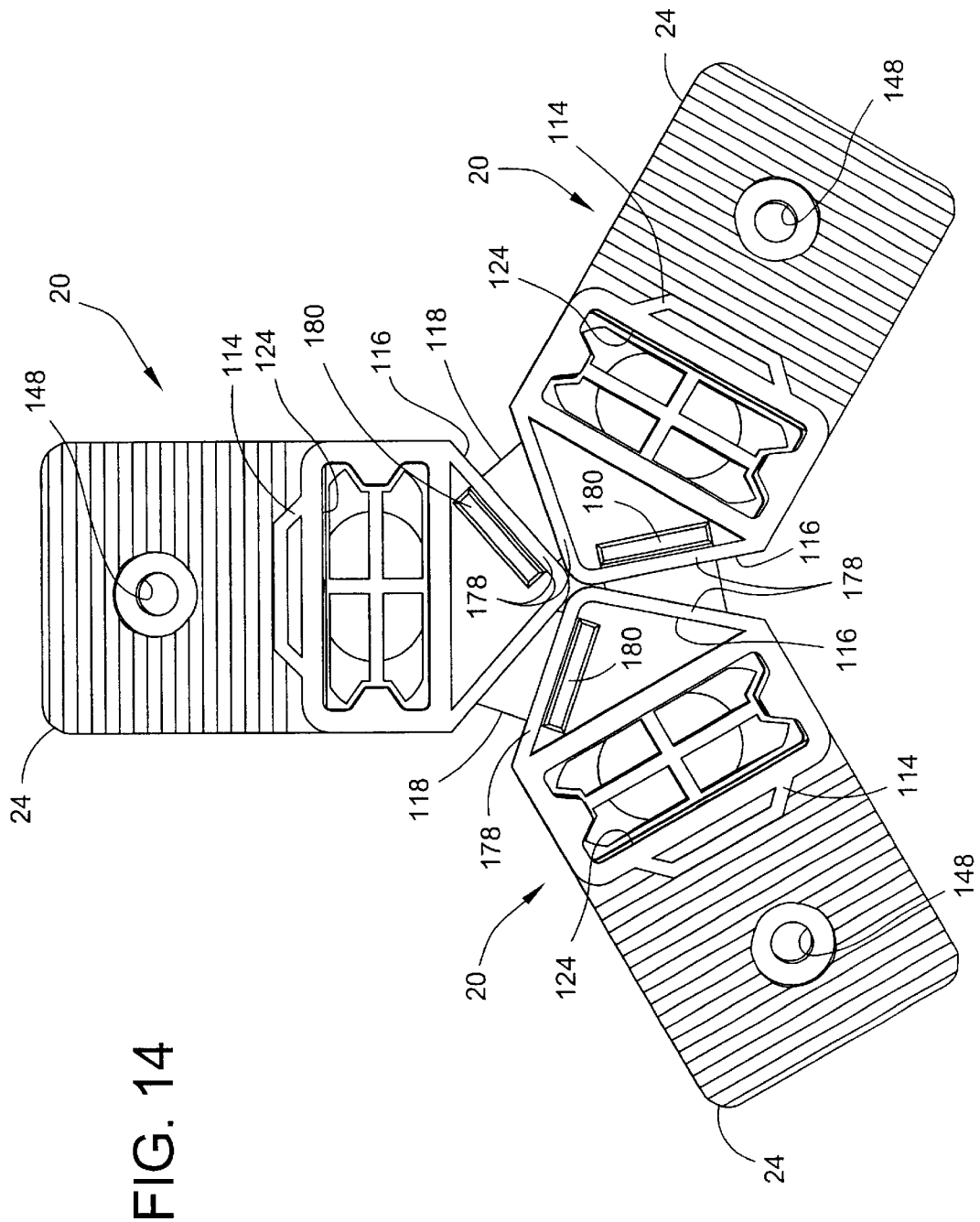
FIG. 14 is a top plan view of feet of all three legs of the tripod when the legs are collapsed for storage and transportation.
Figure 15:
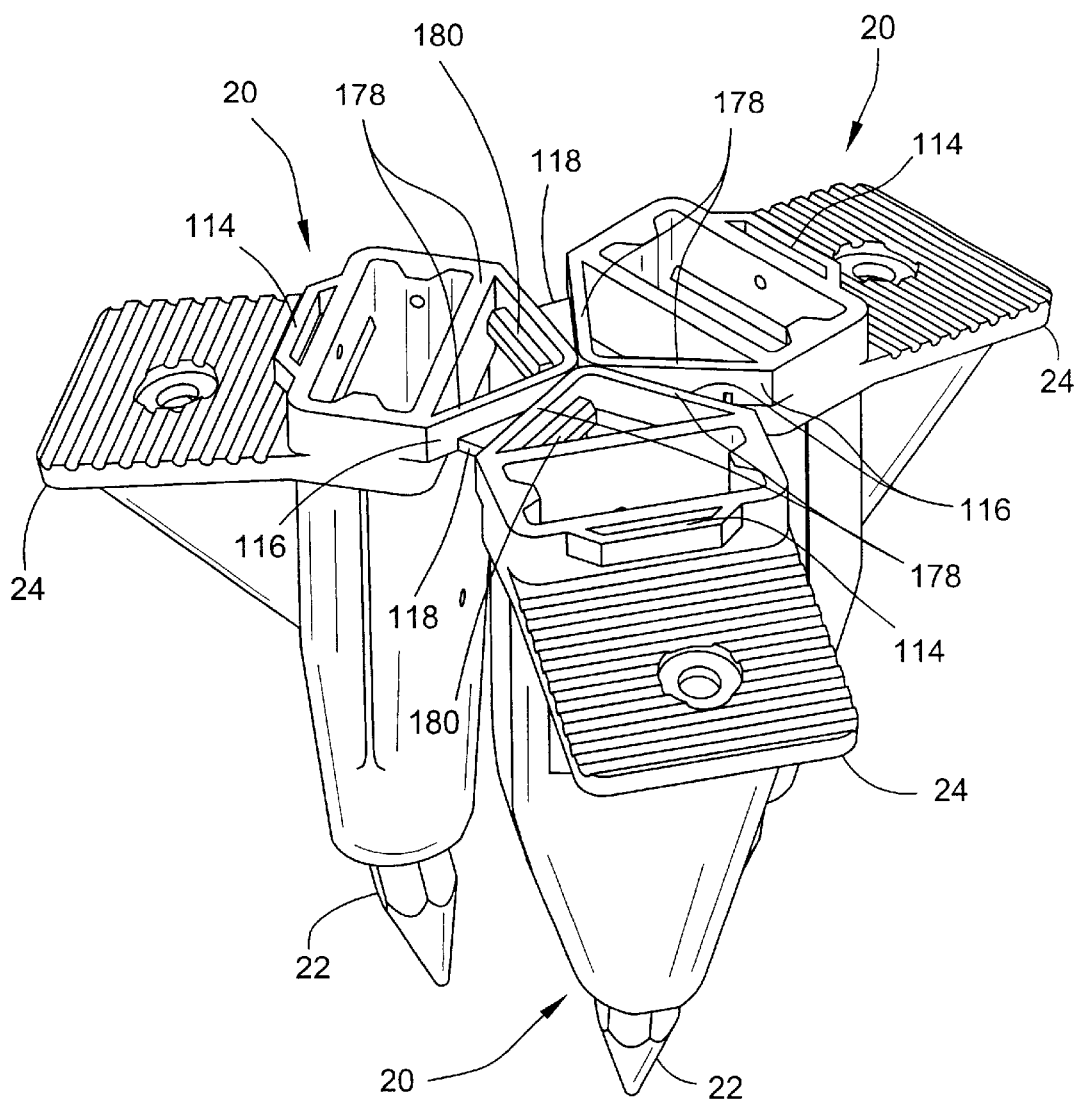
FIG. 15 is a perspective of the feet of FIG. 14.

As previously stated, the feet 20 include the catches 116 and the snap connectors 118 (collectively, "a connector element") used to hold the tripod legs 14 in a collapsed position. In the illustrated embodiment (FIGS. 14 and 15), the catch 116 is a generally triangular loop projecting rearwardly from the feet 20 having arms 178. The catch 116 is capable of use for tying the legs 14 together to prevent the tripod legs from pivoting out flat, or to connect the legs to tie downs in the ground. The snap connector 118 is formed integrally with and extends outward from one of the arms 178 of the catch 116 and has a beveled ridge 180 on its distal end. The material of the foot body 112 is elastic so that the snap connector 118 is capable of resilient deflection. When the legs 14 are pivoted on their hinges 64 from their use position to the collapsed position, the ridge 180 of the snap connector 118 of each feet 20 engages an inside surface of the arm 178 of the catch 116 of another foot. Continued inward movement of the legs 14 forces the ridge 180 under the engaged catch 116 so that the snap connector 118 deflects downwardly until the ridge 180 is received in within the catch. This configuration is illustrated in FIGS. 14 and 15. The legs 14 of the tripod 10 have been entirely removed in these figures so that the interconnection of the snap connectors 118 and catches 116 may be seen. The snap connector 118 moves back toward its relaxed position, placing the ridge 180 in horizontally opposed relation with the arm 178 of the catch 116. The snap connector 118 does not return completely to its relaxed position so that it continues to be biased upwardly against the underside of the arm, holding the ridge 180 within the catch 116. The ridge 180 engages the arm 178 of the catch 116 so that the legs 14 cannot move apart. Thus, the snap connectors 118 and catches 116 hold the legs 14 in the collapsed position.

Figure 16A:
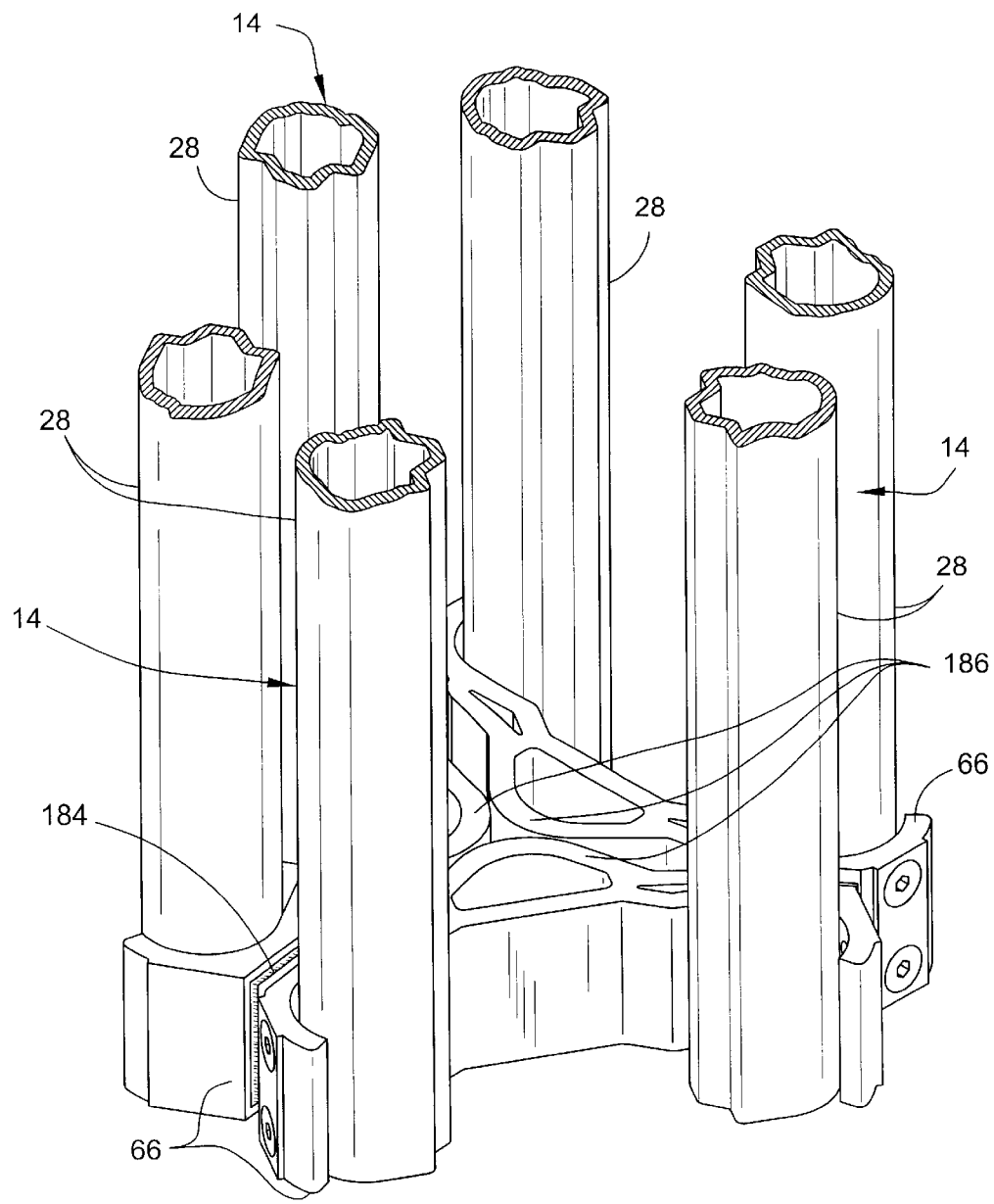
FIG. 16A is a fragmentary perspective of three tripod legs secured together by hook and loop fasteners in a collapsed position of the legs.
Figure 16B:
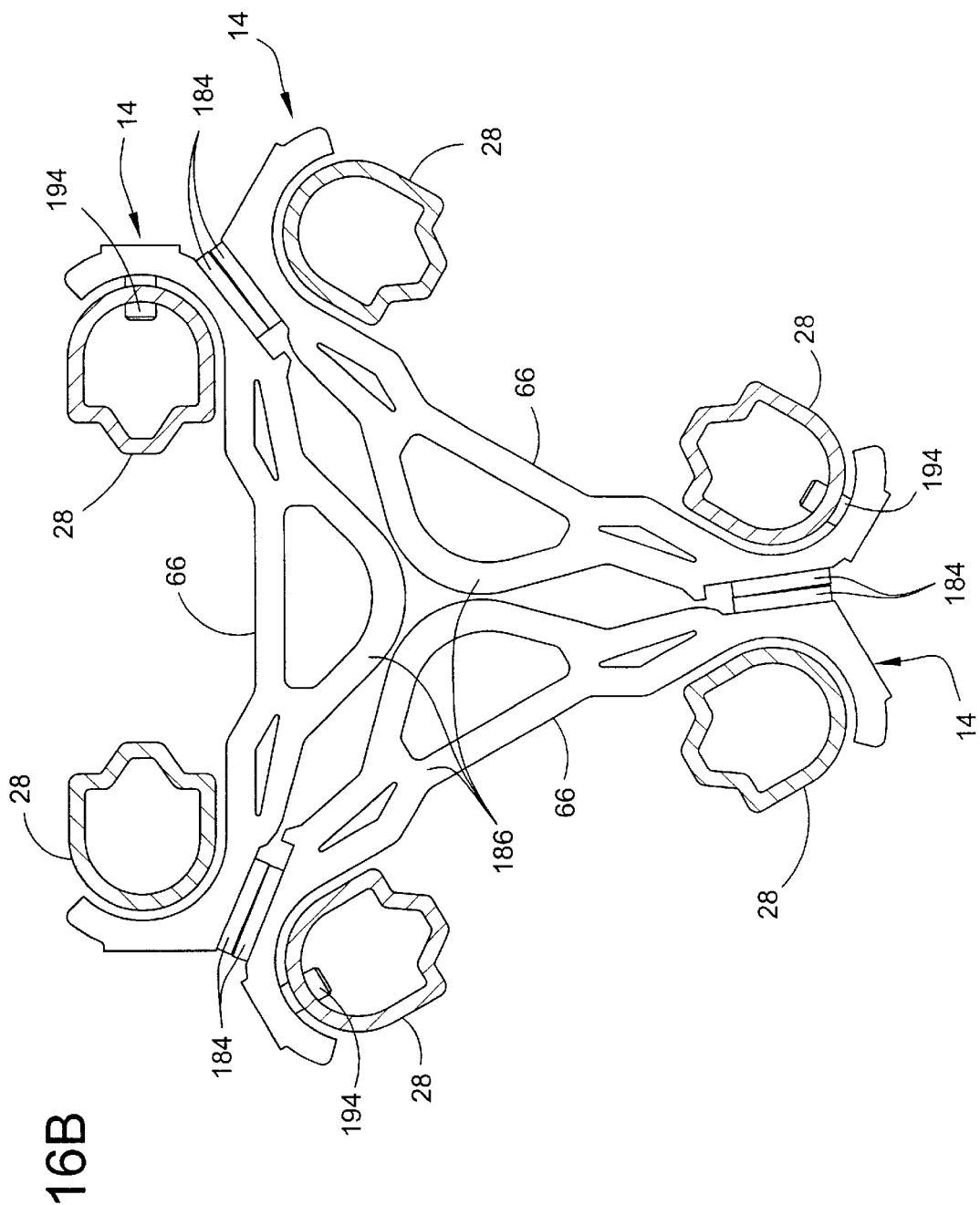
FIG. 16B is a transverse section through the legs of FIG. 16A.

Another construction for holding the legs 14 in the collapsed position is shown in FIGS. 16A and 16B. The connector element is embodied by two hook and loop pads 184 connected to each of the fixtures retaining the rods 28 at their bottoms. Parabolic projections 186 on the back of the fixture 66 are engageable to guide the legs 14 so that the pads 184 engage each other. When the legs 14 are in the collapsed position as shown, the pads 184 engage each other to hold the legs together. The telescoping leg members 18 are removed from FIGS. 16A and 16B for clarity.

Figure 17:
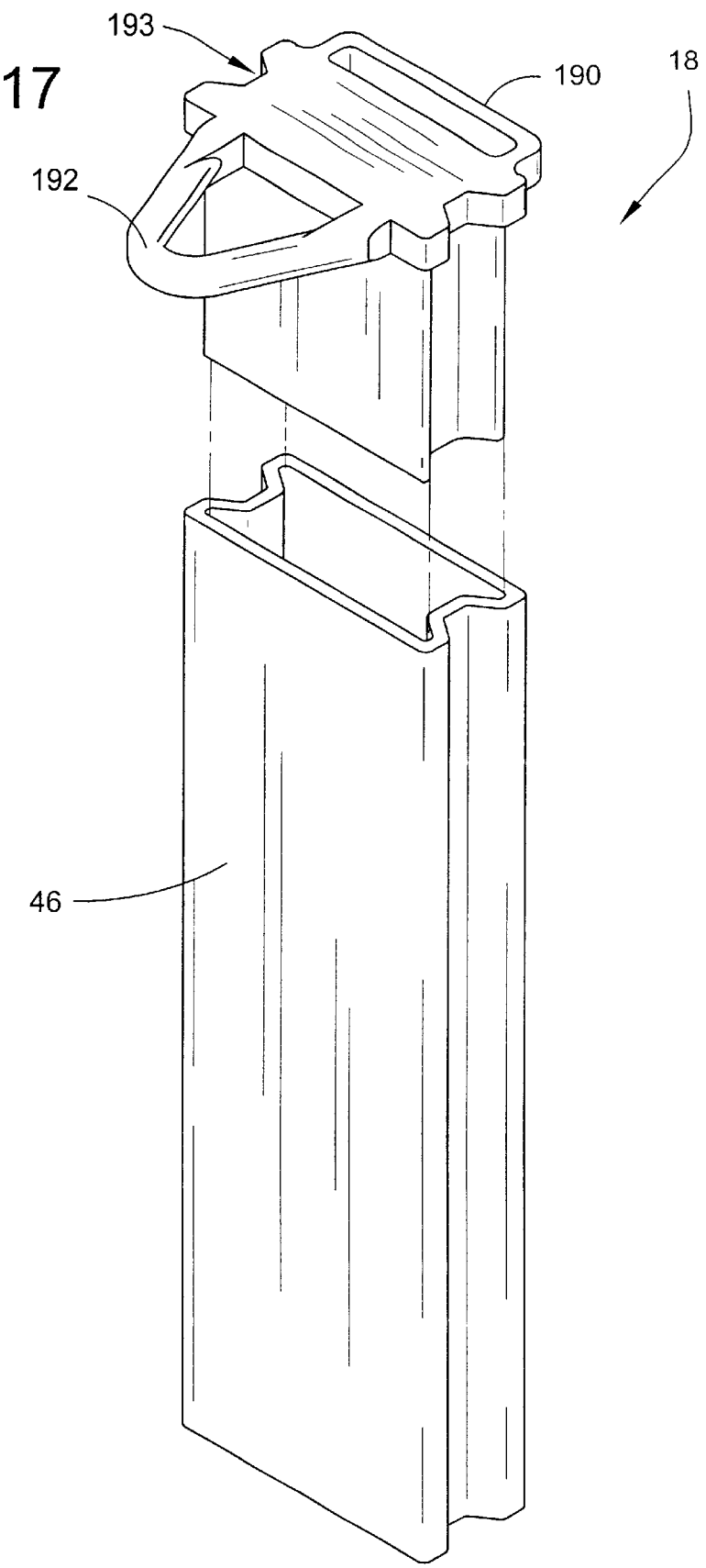
FIG. 17 is a fragmentary perspective of an upper end of a telescoping leg member including a cap of a tripod leg, the cap being exploded from the leg member.

The ring 114 on the front side of the feet 20 is adapted to receive a strap (not shown) for use in carrying the tripod 10 when collapsed and the telescoping leg member 18 is fully retracted in the fixed leg member 16. The telescoping leg member 18 has another ring 190 (FIG. 17) at its upper end to connect the other end of the strap. The same structure which includes the ring 190 at the upper end of the telescoping leg member 18 forms an eye 192 extending inwardly of the leg 14. The eye 192 may be used to connect the legs 14 together in the use position to hold the legs from pivoting outward to a completely flat configuration, such as may happen when the tripod 10 is used on harder surfaces. The eyes 192 may be connected together by a chain or other suitable connector (not shown). The ring 190 and eye 192 are incorporated as part of a cap, generally indicated at 193 shown exploded from the telescoping leg member 18 in FIG. 17. The cap 193 is made of a suitable composite material, such as polycarbonate, and has a lower portion slidably received in the upper end of the telescoping leg member 18 and secured thereto by adhesive.

Figure 18:
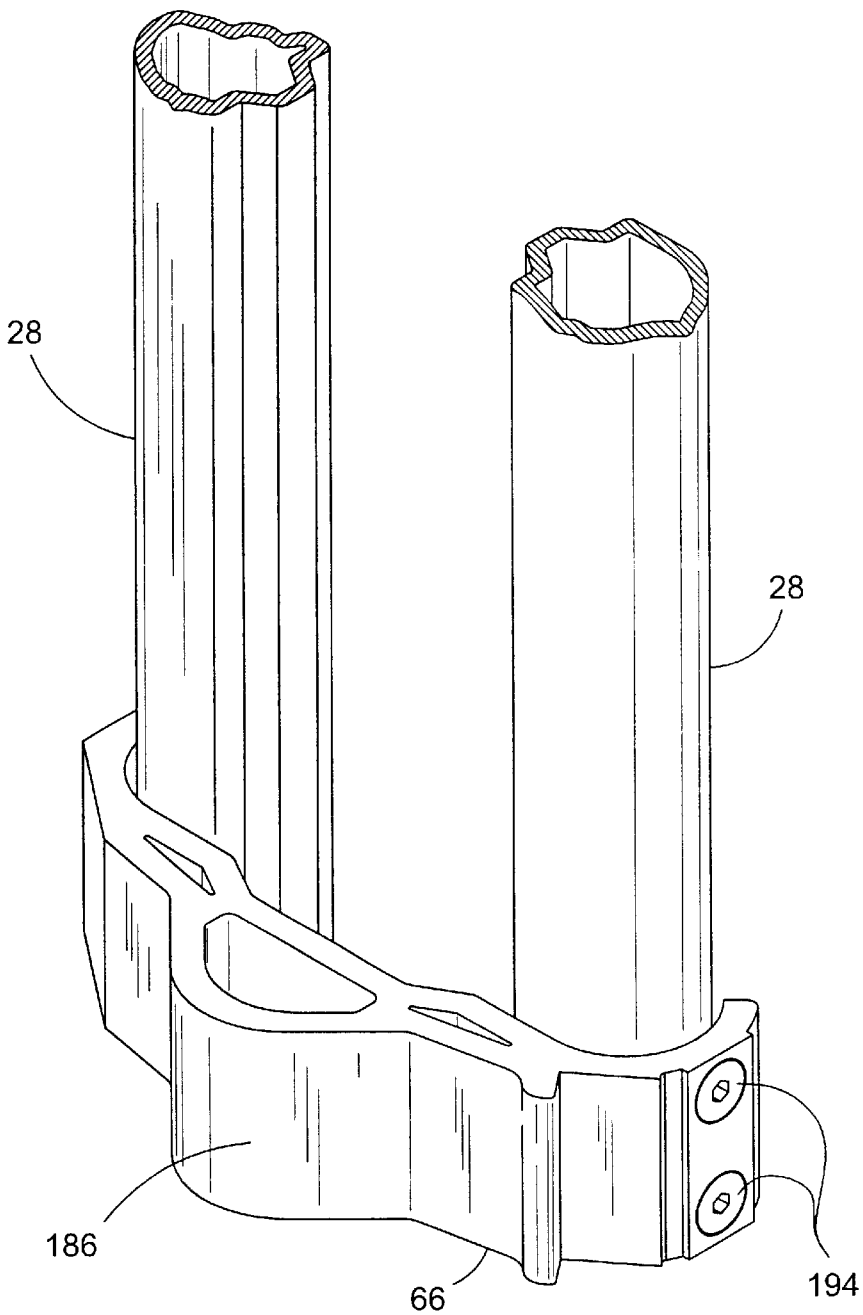
FIG. 18 is a fragmentary perspective of a lower end of a fixed leg member of the tripod leg from the rear of the leg and showing a fixture.
Figure 19:
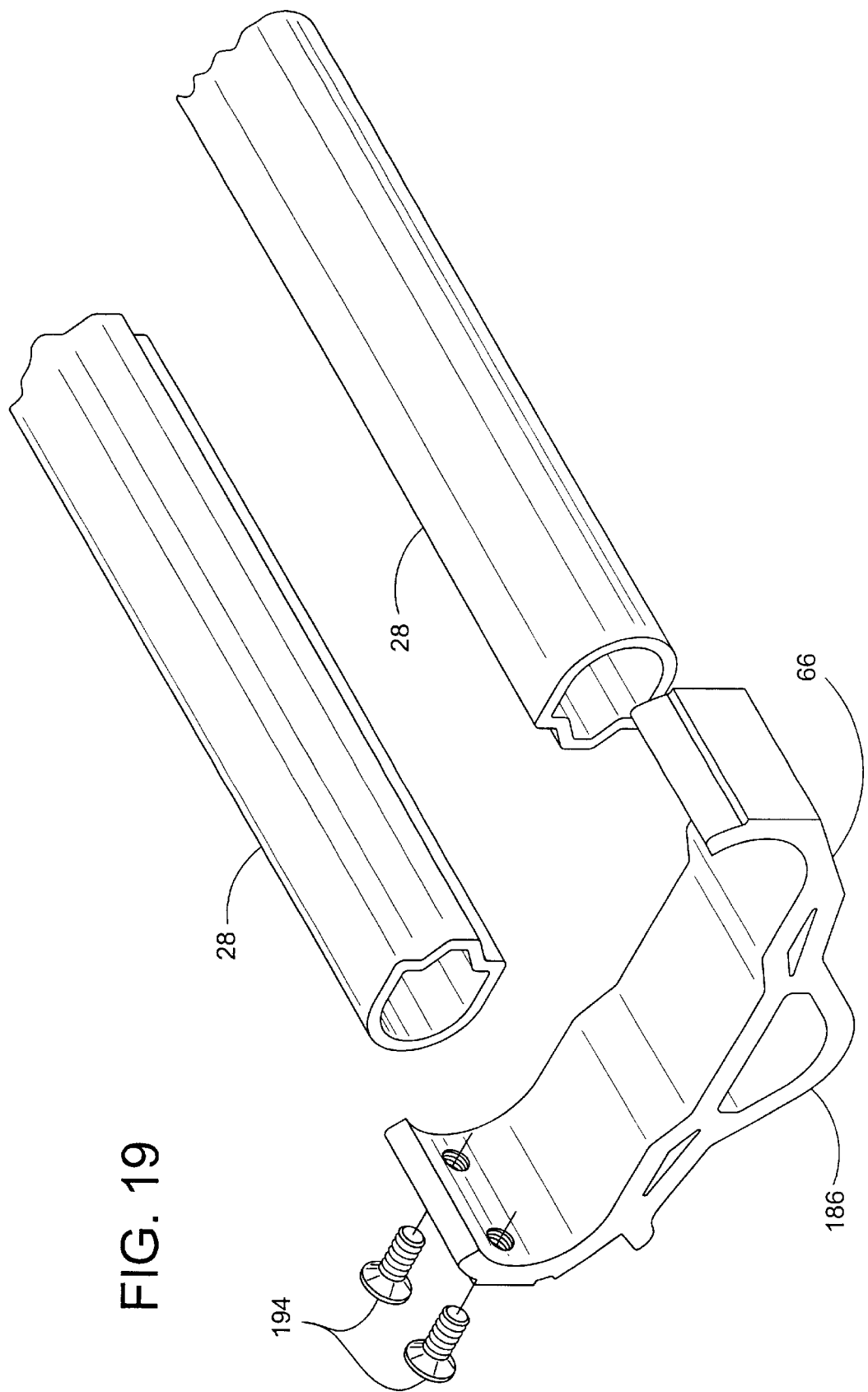
FIG. 19 is an exploded perspective of the fixed leg member lower end of FIG. 18, but seen from the front of the leg.

The tripod 10 is particularly constructed to permit objects to be mounted on the front face 46 of one or more of the telescoping leg members. In order to facilitate mounting of the objects and to simultaneously permit a full range of motion of the telescoping leg member 18, it is necessary that at least one point on the front face 46 of the telescoping leg member be free of obstructions in all positions of extension and retraction of the telescoping leg member with respect to the fixed leg member 16. The fixture 66 at the bottom ends of the rods 28 extends only across the rear face 48 of the telescoping leg member 18. As shown in FIGS. 18 and 19, the fixture 66 is generally C-shaped and attached by two screws 194 to one of the rods 28. The fixture 66 extends part way around the opposite rod a distance to restrain the rods 28 from moving laterally apart from each other. No portion of the fixture 66 extends across the front face 46 of the telescoping leg member 18. As illustrated, the fixture 66 is not capable of applying a holding force to the telescoping member. However, the fixture may be formed to clamp the rods 28 against the legs 14 or to have a set screw (not shown) to apply a holding force to the telescoping leg member 18 to assist locking the leg member in a selected position of extension.

Figure 20:
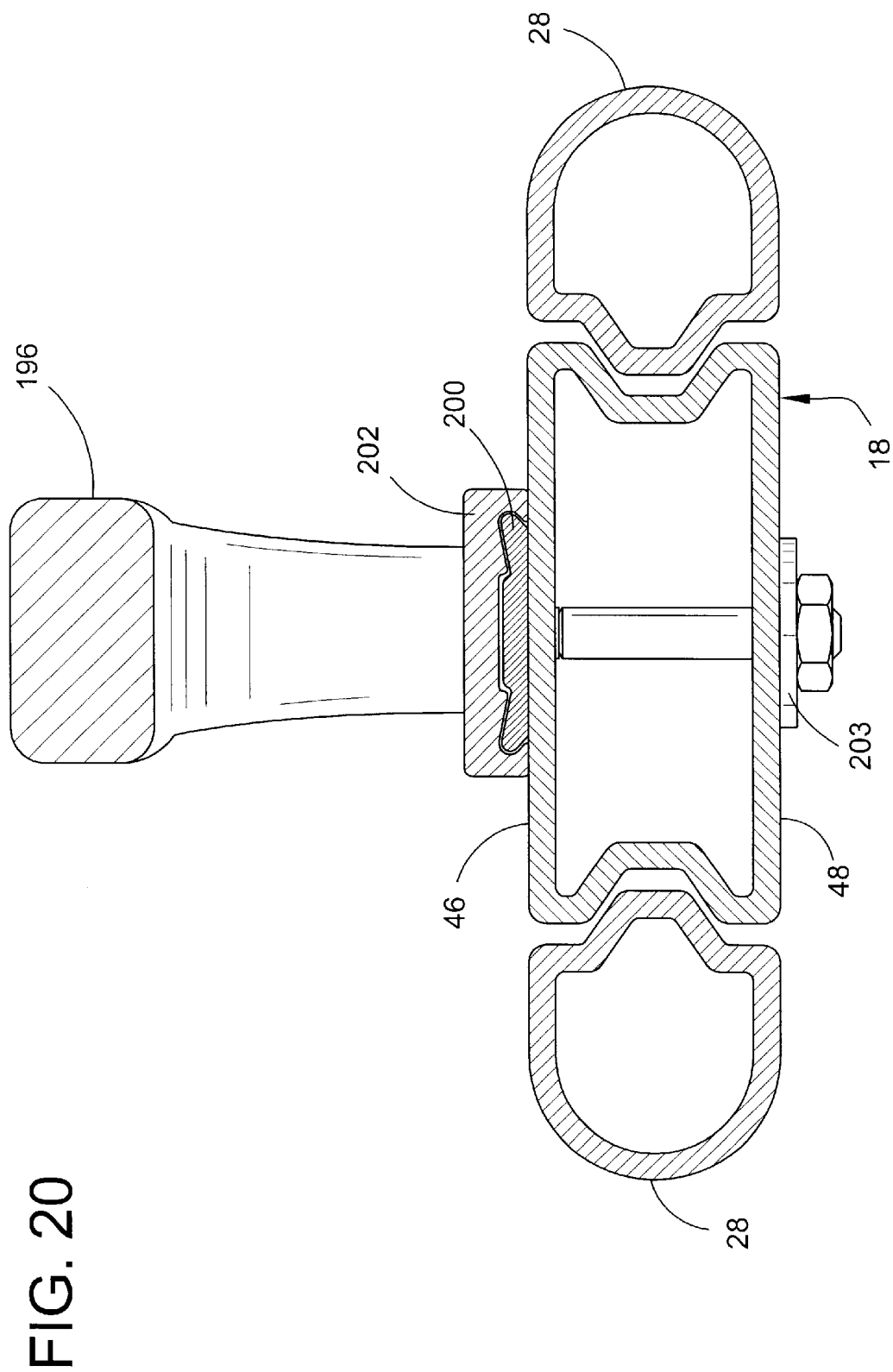
FIG. 20 is a section taken in the plane including line 20—20 of FIG. 1.
Figure 21:
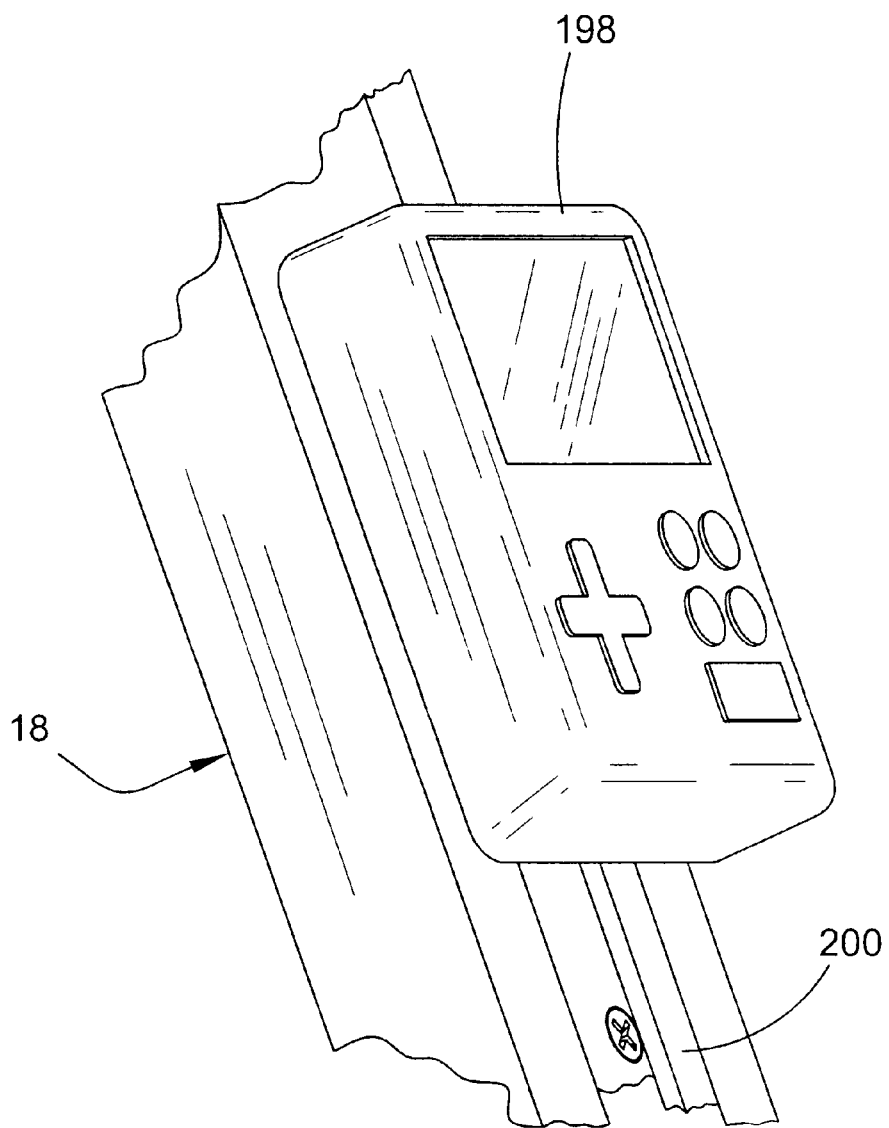
FIG. 21 is a fragmentary perspective of a leg of the tripod mounting an electronic device thereon.

Thus, it is possible to mount objects, such as a handle 196 as shown in FIG. 20 on the front face 46 of the telescoping leg member 18. When the telescoping leg member is extended from the fixed leg member 16, the handle 196 may pass the location of the fixture 66 at the lower end of the rods 28 without any interference. The handle 196 may, but is not required to be permanently attached to the front face 46 of one of the telescoping leg members. Objects which normally have to be carried and held separately from the tripod 10 can be mounted on the telescoping leg member 18. For example as shown in FIG. 21, an electronic surveying device 198 can be so mounted. Preferably, mounting is achieved by affixing a track 200 on the front face 46 of the telescoping member, usually when the tripod leg 14 is manufactured. As shown in FIG. 20, the track is attached by bolts 201 (only one is shown in FIG. 20) which extend through respective washers 203 on the rear face 48 of the telescoping leg member 18 and through the width of the telescoping leg member. It is envisioned that a track could be otherwise mechanically attached, or adhered to the telescoping leg member 18. The handle 196 and the electronic device 198 include attachment members 202 (only the attachment member for the handle is shown) which are shaped for sliding, dovetail connection on the attachment member. Other objects, such as a bag or other container (not shown) for miscellaneous items are envisioned. A screw (not shown) is provided to fix the object on the track 200 at a selected location. The length of the track 200 permits a range of positions for the attached object. It is also possible to entirely remove one object and replace it with another having the same form of attachment member. In the case of the handle 196, it will be possible to reposition the handle along the track 200 to compensate for a change in the center of gravity of the tripod 10. The center of gravity may be changed by the mounting of surveying equipment or other objects to the tripod 10.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A portable support for use in supporting equipment above a surface, the support comprising a head for holding the equipment, legs connected to the head for supporting the head above the surface, each leg comprising a first leg member and a second leg member connected to the first leg member for sliding motion relative thereto between a fully extended position and a fully retracted position, the first leg member having a pair of rods disposed on opposite sides of the second leg member and biased outwardly from the second leg member to facilitate free sliding motion between the first and second leg members and having free ends, the second leg member having a first end located generally between the rods and a second end located outward from between the rods and a second end located outward from between the rods, a clamp having a locked position for squeezing the rods of the first leg member against the second leg member to secure the first leg member and the a selected relative position, and an unlocked position in which the first leg member and the second leg member are movable relative to one another, the clamp being mounted on the second leg member at a location closer to the first end of the second leg member than the second end, the first leg member and the second leg member of at least one of the legs each including a generally wedge-shaped engagement formation interengageable with the wedge-shaped engagement formation of the other under the clamping force of the clamp in the locked position to hold the first leg member and the second leg member in a fixed relative position, the wedge-shaped formations being sized and shaped to prevent the formations from bottoming out in the locked position of the clamp.

2. The portable support as set forth in claim 1 wherein the first leg member comprises a fixed leg member connected to the head and the second leg member comprises a telescoping leg member, and wherein the engagement formations of the fixed leg member and telescoping leg member of said one leg further include connecting surfaces extending between and connecting the engagement surfaces, the connecting surface of the fixed leg member being in spaced relation with the connecting surface of the telescoping leg member in the locked position of the clamp.

3. The portable support as set forth in claim 2 wherein the fixed leg members and telescoping leg members of all of the legs have the generally wedge-shaped engagement formations.

4. The portable support as set forth in claim 3 wherein the wedge-shaped engagement formation of the telescoping leg member comprises a channel and the wedge-shaped engagement formation of the fixed leg member comprises a wedge-shaped protrusion receivable in the channel, the channel having side walls defining the engagement surfaces of the telescoping leg member and the wedge-shaped protrusion having side walls defining the engagement surfaces of the fixed leg member, the protrusion and channel being sized such that both side walls of the protrusion engage both side walls of the channel in the locked position of the clamp.

5. The portable support as set forth in claim 4 wherein the side walls of the channel are maintained parallel to the side walls of the protrusion.

6. The portable support as set forth in claim 4 wherein the channel extends substantially the full length of the telescoping leg member and the wedge-shaped protrusions extend substantially the full length of the rods.

7. The portable support as set forth in claim 4 wherein the engagement surfaces of at least one of the telescoping leg member and fixed leg member are treated to enhance frictional engagement in the locked position of the clamp.

8. The portable support as set forth in claim 4 wherein the telescoping leg member has two of the channels and each rod has one of the wedge-shaped protrusions, each channel receiving a wedge-shaped protrusion of a respective rod.

9. The portable support as set forth in claim 1 wherein the clamp is mounted on the second leg member adjacent to the first end thereof, the clamp and rods are arranged such that as the clamp is moved to the locked position, the portion of the wedge-shaped formation of the first leg member at the free ends of the rods frictionally engage the wedge-shaped formation of the second leg member first, and clamping contact between the wedge-shaped formation of the first leg member and the wedge-shaped formation of the second leg member proceeds from the distal end toward the clamp.

10. The portable support as set forth in claim 1 wherein the first leg member comprises a fixed leg member connected to the head and the second leg member comprises a telescoping leg member, and wherein each fixed leg member further comprises a hinge, pivotally connecting its corresponding leg to the head whereby the legs of the support are movable between a use position in which the legs are spread apart and a collapsed position in which the legs are closer together than in the use position for transportation and storage.

11. The portable support as set forth in claim 10 wherein at least one of the legs has a connector element associated therewith, the connector element being capable of interengaging the legs in the collapsed position of the legs for holding the legs in the collapsed position.

12. The portable support as set forth in claim 11 wherein the connector element comprises snap connectors associated with the legs, the snap connectors being adapted for releaseable snap locking interengagement when the legs are in the collapsed position.

13. The portable support as set forth in claim 11 wherein the connector element comprises hook and loop fastener elements on each leg, the hook and loop fastener elements being adapted for interconnection when the legs are moved to the collapsed position.

14. The portable support as set forth in claim 10 wherein the rods are secured in the hinge at a relaxed spacing, the rods being deflected inwardly toward the telescoping leg member from the relaxed spacing by the clamp in the locked position.

15. The portable support as set forth in claim 14 wherein the hinge comprises a housing, a locating block, a fastener for securing the rods against the locating block in a substantially stress-free condition of the rods, and adhesive in the housing substantially filling spaces in the housing and unitizing the housing, rods and locating blocks.

16. The portable support as set forth in claim 8 wherein the telescoping leg member has a front face directed generally outwardly of the support and a rear face, the support further comprising a fixture for holding the rods and the telescoping leg member together in connected but sliding relation, the fixture extending generally from between the pair of rods generally over the rear face of the telescoping leg member but not extending across the front face of the telescoping leg member so that the front face is not obstructed by the fixture.

17. The portable support as set forth in claim 16 wherein the front face of the telescoping leg has a mount thereon for mounting an object to the front face of the telescoping leg member, the mount being adapted to pass through the location of the fixture as the telescoping leg member moves relative to the rods.

18. The portable support as set forth in claim 17 in combination with the object, wherein the object is selected from a group including: a handle, a container and an electronic surveying device.

19. The portable support as set forth in claim 8 wherein the telescoping leg member has a front face directed generally outwardly of the support and a rear face, the leg being free of structure located outwardly of the front face from the clamp to the distal ends of the rods whereby at least one point on the front face located between the rods in the retracted position of the telescoping leg member is unobstructed in all positions of extension of the telescoping leg.

20. The portable support as set forth in claim 8 further comprising a foot at a bottom end of each telescoping leg for engaging the surface.

21. The portable support as set forth in claim 20 wherein the foot is adapted to mount at least one surface engaging accessory thereon.

22. The portable support as set forth in claim 21 wherein the foot has spaced apart mounting locations for mounting the accessory on the foot.

23. The portable support as set forth in claim 21 wherein the foot comprises a pedal extending laterally outwardly from the foot for application of downward pressure on the leg applied by the foot of a user of the portable support, the pedal having an opening therein constituting one of the mounting locations for the accessory.

24. The portable support as set forth in claim 23 further comprising a plug frangibly connected to the pedal and covering the opening, the plug being adapted to be broken away from the pedal to expose the opening.

25. The portable support as set forth in claim 23 wherein the foot comprises a point and an opening at a bottom of the foot adapted to removably receive the point, and a mounting tab adapted for mounting in the opening in place of the point and for attachment of the accessory, the mounting tab constituting the other of the mounting locations.

26. The portable support as set forth in claim 20 wherein the foot is connected to the telescoping leg member by an adhesive.

27. The portable support as set forth in claim 26 wherein the foot has a cavity receiving the telescoping leg member therein, the cavity tapering generally toward a bottom end of the foot, the telescoping leg member being spaced within the cavity from the foot at least at some locations, and the adhesive filling the space for a unitary bond of the foot to the telescoping leg member.

28. The portable support as set forth in claim 27 wherein the telescoping leg member sealingly engages the foot at a location in the cavity around the entire periphery of the telescoping leg member for blocking flow of adhesive past the location of sealing engagement.

29. The portable support as set forth in claim 28 wherein the foot includes a valve that permits injection of the adhesive into the foot and operable to block adhesive from flowing out of the foot.

30. The portable support as set forth in claim 20 wherein the foot has a ring formed as one piece with the foot and projecting laterally outwardly therefrom.

31. The portable support as set forth in claim 30 wherein the telescoping leg member has a ring projecting laterally outwardly therefrom generally at an upper end of the telescoping leg member, the foot ring and telescoping leg member ring being adapted to receive respective ends of a strap for use in carrying the support.

32. The portable support as set forth in claim 30 wherein each foot has at least one of a snap connector and a catch thereon, the snap connector of one foot being engageable with the catch of another foot in a collapsed configuration of the support legs for releasably holding the legs in the collapsed position.

33. The portable support as set forth in claim 20 wherein each foot has a hook and loop fastener element thereon engageable with a hook and loop fastener of another foot in a collapsed configuration of the support legs for releasably holding the legs in a collapsed position.

34. The portable support as set forth in claim 20 further comprising an elongate spike adapted for connection to one of the support legs in an orientation in which the spike projects below the foot for deeper penetration of the surface on which the support rests.

35. The portable support as set forth in claim 8 in combination with a leg weight adapted for releaseable connection to one of the legs of the support, the leg weight comprising a weight portion and a connector portion, the connector portion being adapted to releasably mount the weight portion of the support leg.

36. The portable support as set forth in claim 35 wherein the connector portion is attached to the weight portion.

37. The portable support as set forth in claim 36 wherein the connector portion is a quick release connector.

38. The portable support as set forth in claim 37 wherein the connector portion comprises straps having hook and loop fastener material thereon, the straps being adapted for connection around a leg for holding the leg weight on the leg.

39. The portable support as set forth in claim 35 wherein the weight portion comprises a container sized and shaped for holding ballast material, the container having a closure adapted to be opened for insertion and removal of ballast material and adapted to be closed.

40. A portable support as set forth in claim 10 wherein the hinge includes a hinge pin extending outwardly from the hinge, the head comprising a hinge pin receptacle receiving the hinge pin and sealing the hinge pin in the head.

41. A portable support as set forth in claim 40 further comprising a first gasket received around the hinge and engaging the head where the pin enters the receptacle, the head including a plate mounted on the head over the receptacle and a gasket disposed between the head and the plate for sealing between the head and plate around the receptacle.

42. The portable support as set forth in claim 8 wherein there are two legs.

43. The portable support as set forth in claim 8 wherein there are three legs.

44. A leg for a portable support for use in supporting equipment above a surface, the leg comprising a first leg member, a second leg member connected to the first leg member for sliding motion relative to the first leg member between a fully extended position and a fully retracted position, the first leg member having a pair of rods disposed on opposite sides of the second leg member and biased outwardly from the second leg member to facilitate free sliding motion between the first and second leg members and having free ends, the second leg member having a first end located generally between the rods and a second end located outward from between the rods, a clamp having a locked position for squeezing the rods of the first leg member against the second leg member to secure the first leg member and the second leg member in a selected relative position, and an unlocked position in which the first leg member and the second leg member are movable relative to one another, the clamp being mounted on the second leg member at a location closer to the first end of the second leg member than the second end, the first leg member and the second leg member of the leg each including a generally wedge-shaped engagement formation interengageable with the wedge-shaped engagement formation of the other under the clamping force of the clamp in the locked position to hold the first leg member and the second leg member in a fixed relative position, the wedge-shaped formations being sized and shaped to prevent the formations from bottoming out in the locked position of the clamp.

45. The leg as set forth in claim 44 wherein the engagement formations of the fixed leg member and telescoping leg member further include connecting surfaces extending between and connecting the engagement surfaces, the connecting surface of the fixed leg member being in spaced relation with the connecting surface of the telescoping leg member in the locked position of the clamp.

46. The leg as set forth in claim 45 wherein the first leg member comprises a fixed leg member and the second leg member comprises a telescoping leg member, and wherein wedge-shaped engagement formation of the telescoping leg member comprises a channel and the wedge-shaped engagement formation of the fixed leg member comprises a wedge-shaped protrusion receivable in the channel, the channel having side walls defining the engagement surfaces of the telescoping leg member and the wedge-shaped protrusion having side walls defining the engagement surfaces of the fixed leg member, the protrusion and channel being sized such that both side walls of the protrusion engage both side walls of the channel in the locked position of the clamp.

47. The leg as set forth in claim 46 wherein the channel extends substantially the full length of the telescoping leg member and the wedge-shaped protrusions extend substantially the full length of the rods.

48. The leg as set forth in claim 46 wherein the engagement surfaces of at least one of the telescoping leg member and fixed leg member are treated to enhance frictional engagement in the locked position of the clamp.

49. The leg as set forth in claim 46 wherein the fixed leg member comprises a pair of rods disposed on opposite sides of the telescoping leg member, the telescoping leg member having two of the channels and each rod having one of the wedge-shaped protrusions, each channel receiving a wedge-shaped protrusion of a respective rod.

50. The leg as set forth in claim 47 wherein the telescoping leg member has two of the channels and each rod has one of the wedge-shaped protrusions, each channel receiving a wedge-shaped protrusion of a respective rod. further comprises a hinge for pivotally connecting the leg to a head of the support.

51. The leg as set forth in claim 50 wherein the leg has a connector element associated therewith, the connector element being capable of interengaging other connector elements of other legs installed in the support for holding the legs in a collapsed position.

52. The leg as set forth in claim 50 wherein the rods are secured in the hinge at a relaxed spacing, the rods being deflected inwardly toward the telescoping leg member from the relaxed spacing by the clamp in the locked position.

53. The leg as set forth in claim 52 wherein the hinge comprises a housing, a locating block, a fastener for securing the rods against the locating block in a substantially stress-free condition of the rods, and adhesive in the housing substantially filling spaces in the housing and unitizing the housing, rods and locating block.

54. The leg as set forth in claim 49 wherein the telescoping leg member has a front face directed generally outwardly of the support and a rear face, the leg further comprising a fixture for holding the rods and the telescoping leg member together in connected but sliding relation, the fixture extending generally from between the pair of rods generally over the rear face of the telescoping leg member but not extending across the front face of the telescoping leg member so that the front face is not obstructed by the fixture.

55. The leg as set forth in claim 54 wherein the front face of the telescoping leg has a mount thereon for mounting an object to the front face of the telescoping leg member, the mount being adapted to pass through the location of the fixture as the telescoping leg member moves relative to the rods.

56. The leg as set forth in claim 55 in combination with the object, wherein the object is selected from a group including: a handle, a container and an electronic surveying device.

57. The leg as set forth in claim 49 wherein the telescoping leg member has a front face directed generally outwardly of the support and a rear face, the leg being free of structure located outwardly of the front face from the clamp to the distal ends of the rods whereby at least one point on the front face located between the rods in the retracted position of the telescoping leg member is unobstructed in all positions of extension of the telescoping leg member.

58. The leg as set forth in claim 49 further comprising a foot at a bottom end of the telescoping leg for engaging the surface.

59. The leg as set forth in claim 58 wherein the foot is adapted to mount at least one surface engaging accessory thereon.

60. The leg as set forth in claim 59 wherein the foot has spaced apart mounting locations for mounting the accessory on the foot.

61. The leg as set forth in claim 60 wherein the foot comprises a pedal extending laterally outwardly from the foot for application of downward pressure on the leg applied by the foot of a user of the portable support, the pedal having an opening therein constituting one of the mounting locations for the accessory.

62. The leg as set forth in claim 61 further comprising a plug frangibly attached to the pedal and covering the opening, the plug being adapted to be broken away from the pedal to expose the opening.

63. The leg as set forth in claim 61 wherein the foot comprises a point and an opening at a bottom of the foot adapted to removably receive the point, and a mounting tab adapted for mounting in the opening in place of the point for attachment of the accessory, the mounting tab constituting the other of the mounting locations.

64. The leg as set forth in claim 58 wherein the foot is connected to the telescoping leg member by an adhesive.

65. The leg as set forth in claim 64 wherein the telescoping leg member sealingly engages the foot at a location in the cavity around the entire periphery of the telescoping leg member for blocking flow of adhesive past the location of sealing engagement.

66. The leg as set forth in claim 65 wherein the telescoping leg member sealingly engages the foot at a location in the cavity around the entire periphery of the leg member for blocking flow of adhesive past the location of sealing engagement.

67. The leg as set forth in claim 66 wherein the foot includes a valve permitting injection of the adhesive into the foot and operable to block adhesive from flowing out of the foot.

68. The leg as set forth in claim 58 wherein the foot has a ring formed as one piece with the foot and projecting laterally outwardly therefrom.

69. The leg as set forth in claim 68 wherein the telescoping leg member has a ring projecting laterally outwardly therefrom generally at an upper end of the telescoping member.

70. The leg as set forth in claim 58 further comprising an elongate spike adapted for connection to the leg in an orientation in which the spike projects below the foot.

71. A leg for a portable support for use in supporting equipment above a surface, the leg comprising:
a fixed leg member;
a telescoping leg member connected to the fixed leg member for sliding motion relative to the fixed leg member between a fully extended position and a fully retracted position, the fixed leg member comprising a pair of rods disposed on opposite sides of the telescoping leg member and a rod receptacle comprising a housing, a locating block, a fastener for securing the rods against the locating block in a relaxed position in which the rods are substantially stress-free, and adhesive in the housing substantially filling spaces in the housing;

a clamp having a locked position for deflecting the rods inwardly from the relaxed position toward the telescoping member, and an unlocked position in which rods are released to their relaxed positions and the telescoping leg member is movable relative to the rods.

72. A leg as set forth in claim 71 wherein the locating block locates the rods in a selected position about their longitudinal axes.

73. A method for making a leg for a portable support comprising the steps of:

placing the ends of two rods in a housing;

locating the rods against a locator block on opposite sides thereof such that the locator block fixes the separation of the rods;

injecting an adhesive into the housing around the rods and block to substantially fill the housing whereby the rods, locating block and housing constitute a substantially unitary structure;

fitting a telescoping leg member between the rods such that the telescoping leg member is capable of sliding longitudinally of the rods for selective adjustment of the length of the leg.

74. A leg for a portable support for use in supporting equipment above a surface, leg comprising a fixed leg member, a telescoping leg member connected to the fixed leg member for sliding motion relative to the fixed leg member between a fully extended position and a fully retracted position, the telescoping leg member has a front face directed generally outwardly of the support and a rear face, the support further comprising a fixture for holding the fixed leg member and the telescoping leg member together in connected but sliding relation, the fixture extending from the telescoping leg member generally over one of the front and rear faces of the telescoping leg member but not extending across the other of the front and rear faces of the telescoping leg member.

75. A leg as set forth in claim 74 further comprising a mount on the front face of the telescoping leg member in a location where the mount passes the fixture as the leg moves between the fully extended and fully retracted positions, the mount being adapted to mount objects on the leg.

76. A leg for a portable support for use in supporting equipment above a surface, the leg comprising a fixed leg member, a telescoping leg member connected to the fixed leg member for sliding motion relative to the fixed leg member between a fully extended position and a fully retracted position, the telescoping leg member having a front face directed generally outwardly of the support and a rear face, the telescoping leg member being connected to the fixed leg member to restrain movement of the fixed and telescopic leg members in a direction parallel to the front and rear faces so that the telescoping leg member remains in engagement with the fixed leg member during said sliding motion of the telescoping leg member relative to the fixed leg member, wherein the connection of the fixed leg member and the telescoping leg member does not obstruct at least one of the front and rear faces of the telescoping leg member.

77. A portable support for use in supporting equipment above a surface, the support comprising a head for holding the equipment, legs connected to the head for supporting the head above the surface, each leg comprising a fixed leg member connected to the head and a telescoping leg member connected to the fixed leg member for sliding motion relative to the fixed leg member between a fully extended position and a fully retracted position, a clamp having a locked position for squeezing the telescoping leg member and the fixed leg member together to secure the telescoping leg member in a selected position relative to the fixed leg member, and an unlocked position in which the telescoping leg member is movable relative to the fixed leg member, the clamp comprising a pair of opposed jaws located on opposite sides of the leg, a connecting bar slidably connecting the jaws together, a cam pivotally mounted on the connecting bar and engageable with one of the jaws being operable to push the jaws toward each other on the connecting bar in the locked position and to permit the jaws to move apart in the unlocked position, and at least one spring release element associated with one of the jaws between the jaw and the leg, the spring element being compressed against the leg when the clamp is in the locked position, the spring element actively pushing the jaws apart when the cam permits the jaws to move apart.

78. A portable support as set forth in claim 45 wherein the engagement surfaces make an angle of at least about 35° with the connecting surfaces.

79. A portable support for use in supporting equipment above a surface, the support comprising a head for holding the equipment, legs connected to the head for supporting the head above the surface, each leg comprising a first leg member and a second leg member connected to the first leg member for sliding motion relative thereto between a fully extended position and a fully retracted position, the first leg member having a pair of rods disposed on opposite sides of the second leg member, a clamp having a locked position for squeezing the second leg member and the first leg member together to secure the first leg member and the second leg member in a selected relative position, and an unlocked position in which the first leg member and the second leg member are movable relative to one another, the first leg member and the second leg member of at least one of the legs each including a generally wedge-shaped engagement formation interengageable with the wedge-shaped engagement formation of the other under the clamping force of the clamp in the locked position to hold the first leg member and the second leg member in a fixed relative position, the wedge-shaped formations being sized and shaped to prevent the formations from bottoming out in the locked position of the clamp, wherein the clamp and rods are arranged such that as the clamp is moved to the locked position, the portion of the wedge-shaped formation of the first leg member at the free ends of the rods frictionally engage the wedge-shaped formation of the second leg member first, and clamping contact between the wedge-shaped formation of the first leg member and the wedge-shaped formation of the second leg member proceeds from the distal end toward fixed ends of the rods.

* * * * *

UNITED STATES PATENT AND TRADEMARK OFFICE
CERTIFICATE OF CORRECTION

PATENT NO. : 6,688,566 B1
DATED : February 10, 2004
INVENTOR(S) : Stephen B. Crain et al.

It is certified that error appears in the above-identified patent and that said Letters Patent is hereby corrected as shown below:

Column 19,
Lines 1-4, "wherein the first leg member comprises a fixed leg member and the second leg member comprises a telescoping leg member, and wherein wedge-shaped" should read -- wherein wedge-shaped --.
Lines 31-33, "respective rod. further comprising a hinge for pivotally connecting the leg to a head of the support." should read -- respective rod. --.

Column 21,
Line 9, "member, and an" should read -- member to selectively secure the telescoping leg member in a selected position relative to the fixed leg member, and an --.
Line 31, "surface, leg" should read -- surface, the leg --.

Column 21, line 49 through Column 22, line 26,
Claims 76 and 77 were entered in the patent however, these claims were cancelled during prosecution and should not be recited in the patent.

Column 22,
Line 61, insert claim 81 as follows:
-- A portable support as set forth in claim 2 wherein the engagement surfaces make an angle of at least about 35° with the connecting surfaces. --.

Signed and Sealed this

Twenty-ninth Day of March, 2005

JON W. DUDAS
*Director of the United States Patent and Trademark Office*